US012256415B2

(12) United States Patent
Aktas et al.

(10) Patent No.: US 12,256,415 B2
(45) Date of Patent: Mar. 18, 2025

(54) BROADCAST OF SIDELINK RESOURCE INDICATION

(71) Applicant: QUALCOMM Incorporated, San Diego, CA (US)

(72) Inventors: Tugcan Aktas, La Jolla, CA (US); Seyedkianoush Hosseini, San Diego, CA (US); Yeliz Tokgoz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 644 days.

(21) Appl. No.: 17/455,048

(22) Filed: Nov. 16, 2021

(65) Prior Publication Data

US 2022/0322290 A1 Oct. 6, 2022

Related U.S. Application Data

(60) Provisional application No. 63/201,613, filed on May 6, 2021, provisional application No. 63/200,948, filed on Apr. 5, 2021.

(51) Int. Cl.
*H04W 72/30* (2023.01)
*H04W 72/02* (2009.01)
(Continued)

(52) U.S. Cl.
CPC ........... *H04W 72/30* (2023.01); *H04W 72/02* (2013.01); *H04W 72/12* (2013.01); *H04W 72/20* (2023.01); *H04W 72/541* (2023.01)

(58) Field of Classification Search
None
See application file for complete search history.

(56) References Cited

U.S. PATENT DOCUMENTS 11,832,291 B2 * 11/2023 Li ..................... H04W 72/1263
2020/0374864 A1 * 11/2020 Kuang .................... H04W 8/26
(Continued)

OTHER PUBLICATIONS

Fraunhofer HHI, et al., "Resource Allocation Enhancements for Mode 2", 3GPP TSG RAN WG1 Meeting #104-e, R1-2100702, 3rd Generation Partnership Project, Mobile Competence Centre, 650, Route Des Lucioles, F-06921 Sophia-Antipolis Cedex, France, vol. RAN WG1, No. e-Meeting, Jan. 25, 2021-Feb. 5, 2021 Jan. 18, 2021, XP051970475, pp. 1-13.
(Continued)

*Primary Examiner* — Michael J Moore, Jr.
*Assistant Examiner* — Gautam Sharma
(74) *Attorney, Agent, or Firm* — Harrity & Harrity, LLP

(57) ABSTRACT

Various aspects of the present disclosure generally relate to wireless communication. In some aspects, a first user equipment (UE) may receive, in a first broadcast message from a second UE, an indication of one or more sidelink resources in a resource selection window of a sidelink channel that are available for transmission by the second UE to a third UE. The UE may sense the sidelink channel. The UE may select one or more candidate sidelink resources that are available for a fourth UE to use for transmission to the first UE based at least in part on the indication in the broadcast message and the sensing of the sidelink channel. The UE may transmit, to the fourth UE in a second broadcast message, an indication of the candidate sidelink resources that are available for the fourth UE. Numerous other aspects are described.

30 Claims, 15 Drawing Sheets

(51) Int. Cl.
*H04W 72/12* (2023.01)
*H04W 72/20* (2023.01)
*H04W 72/541* (2023.01)

(56) References Cited

U.S. PATENT DOCUMENTS

| | | | | |
|---|---|---|---|---|
| 2021/0212044 A1* | 7/2021 | Ryu | .................. | H04W 72/0453 |
| 2021/0219268 A1* | 7/2021 | Li | ..................... | H04W 72/20 |
| 2021/0219320 A1* | 7/2021 | Belleschi | .............. | H04W 72/20 |
| 2021/0297994 A1* | 9/2021 | Zhang | .................. | H04L 1/1887 |
| 2021/0314916 A1* | 10/2021 | Fouad | .................. | H04W 72/02 |
| 2021/0337519 A1* | 10/2021 | Farag | .................. | H04L 5/0078 |
| 2022/0030575 A1* | 1/2022 | Farag | .................. | H04L 5/0053 |
| 2022/0086803 A1* | 3/2022 | Li | ..................... | H04W 72/0446 |
| 2022/0095280 A1* | 3/2022 | Farag | .................. | H04W 72/23 |
| 2022/0239416 A1* | 7/2022 | Zhao | .................. | H04W 52/367 |
| 2022/0394678 A1* | 12/2022 | Zhang | .................. | H04W 72/02 |
| 2023/0044879 A1* | 2/2023 | Jiao | .................... | H04W 72/044 |
| 2023/0074206 A1* | 3/2023 | Zhang | .................. | H04L 1/1848 |
| 2023/0131882 A1* | 4/2023 | Lin | ................... | H04W 72/0446 370/329 |
| 2023/0217470 A1* | 7/2023 | Zhang | .................. | H04W 72/40 |
| 2023/0362895 A1* | 11/2023 | Su | ....................... | H04W 72/044 |
| 2023/0379947 A1* | 11/2023 | Tsai | ..................... | H04W 72/25 |

OTHER PUBLICATIONS

Fujitsu: "Considerations on Inter-UE Coordination for Mode 2 Enhancements", 3GPP TSG RAN WG1 Meeting #104-e, R1-2100746, 3rd Generation Partnership Project, Mobile Competence Centre, 650, Route Des Lucioles, F-06921 Sophia-Antipolis Cedex, France, vol. RAN WG1, No. e-Meeting, Jan. 25, 2021-Feb. 5, 2021 Jan. 18, 2021, XP051970499, pp. 1-21.

International Search Report and Written Opinion—PCT/US2022/070692—ISA/EPO—Jun. 1, 2022.

LG Electronics: "Discussion on Feasibility and Benefits for Mode 2 Enhancement", 3GPP TSG RAN WG1 Meeting #103-e, R1-2007896, 3rd Generation Partnership Project, Mobile Competence Centre, 650, Route Des Lucioles, F-06921 Sophia-Antipolis Cedex, France, vol. RAN WG1, No. e-Meeting Oct. 26, 2020-Nov. 13, 2020, Oct. 24, 2020, XP051946544, 26 Pages.

Robert Bosch GMBH: "Sidelink Resource Allocation Enhancements", 3GPP TSG RAN WG1 #102-e, R1-2006876, 3rd Generation Partnership Project, Mobile Competence Centre, 650, Route Des Lucioles, F-06921 Sophia-Antipolis Cedex, France, vol. RAN WG1, No. E-Meeting, Aug. 17, 2020-Aug. 28, 2020 Aug. 7, 2020, XP051918289, 5 Pages.

* cited by examiner

BROADCAST OF SIDELINK RESOURCE INDICATION

CROSS-REFERENCE TO RELATED APPLICATIONS

This Patent Application claims priority to U.S. Provisional Patent Application No. 63/200,948, filed on Apr. 5, 2021, entitled "BROADCAST OF SIDELINK RESOURCE INDICATION," and U.S. Provisional Patent Application No. 63/201,613, filed on May 6, 2021, entitled "BROADCAST OF SIDELINK RESOURCE INDICATION," both of which are assigned to the assignee hereof. The disclosures of these prior Applications are considered part of and are incorporated by reference into this Patent Application.

FIELD OF THE DISCLOSURE

Aspects of the present disclosure generally relate to wireless communication and to techniques and apparatuses for broadcasting an indication of sidelink resources.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" or "forward link" refers to the communication link from the BS to the UE, and "uplink" or "reverse link" refers to the communication link from the UE to the BS. As will be described in more detail herein, a BS may be referred to as a Node B, a gNB, an access point (AP), a radio head, a transmit receive point (TRP), a New Radio (NR) BS, or a 5G Node B.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a first user equipment (UE) includes receiving, in a first broadcast message from a second UE, an indication of one or more sidelink resources in a resource selection window of a sidelink channel that are available for transmission by the second UE to a third UE. The method may include sensing the sidelink channel and selecting one or more candidate sidelink resources that are available for a fourth UE to use for transmission to the first UE based at least in part on the indication in the broadcast message and the sensing of the sidelink channel. The method may include transmitting, to the fourth UE in a second broadcast message, an indication of the one or more candidate sidelink resources that are available for the fourth UE.

In some aspects, a method of wireless communication performed by a first UE includes selecting one or more candidate sidelink resources, from within a resource selection window after sensing a sidelink channel, that are available for a second UE to use for transmission to the first UE, and transmitting, in a broadcast message, an indication of the one or more candidate sidelink resources.

In some aspects, a first UE for wireless communication includes a memory and one or more processors, coupled to the memory, configured to receive, in a first broadcast message from a second UE, an indication of one or more sidelink resources in a resource selection window of a sidelink channel that are available for transmission by the second UE to a third UE. The one or more processors may be configured to sense the sidelink channel and select one or more candidate sidelink resources that are available for a fourth UE to use for transmission to the first UE based at least in part on the indication in the broadcast message and the sensing of the sidelink channel. The one or more processors may be configured to transmit, to the fourth UE in a second broadcast message, an indication of the one or more candidate sidelink resources that are available for the fourth UE.

In some aspects, a first UE for wireless communication includes a memory and one or more processors, coupled to the memory, configured to select one or more candidate sidelink resources, from within a resource selection window after sensing a sidelink channel, that are available for a second UE to use for transmission to the first UE, and transmit, in a broadcast message, an indication of the one or more candidate sidelink resources.

In some aspects, a non-transitory computer-readable medium storing a set of instructions for wireless communication includes one or more instructions that, when executed by one or more processors of a first UE, cause the first UE to receive, in a first broadcast message from a second UE, an indication of one or more sidelink resources in a resource selection window of a sidelink channel that are available for transmission by the second UE to a third UE, sense the sidelink channel, select one or more candidate sidelink resources that are available for a fourth UE to use for transmission to the first UE based at least in part on the indication in the broadcast message and the sensing of the sidelink channel, and transmit, to the fourth UE in a second broadcast message, an indication of the one or more candidate sidelink resources that are available for the fourth UE.

In some aspects, a non-transitory computer-readable medium storing a set of instructions for wireless communication includes one or more instructions that, when executed by one or more processors of a first UE, cause the first UE to select one or more candidate sidelink resources, from within a resource selection window after sensing a sidelink channel, that are available for a second UE to use for transmission to the first UE, and transmit, in a broadcast message, an indication of the one or more candidate sidelink resources.

In some aspects, a first apparatus for wireless communication includes means for receiving, in a first broadcast message from a second apparatus, an indication of one or more sidelink resources in a resource selection window of a sidelink channel that are available for transmission by the second apparatus to a third apparatus, means for sensing the sidelink channel, means for selecting one or more candidate sidelink resources that are available for a fourth apparatus to use for transmission to the first apparatus based at least in part on the indication in the broadcast message and the sensing of the sidelink channel, and means for transmitting, to the fourth apparatus in a second broadcast message, an indication of the one or more candidate sidelink resources that are available for the fourth apparatus.

In some aspects, a first apparatus for wireless communication includes means for selecting one or more candidate sidelink resources, from within a resource selection window after sensing a sidelink channel, that are available for a second apparatus to use for transmission to the first apparatus, and means for transmitting, in a broadcast message, an indication of the one or more candidate sidelink resources.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency chains, power amplifiers, modulators, buffers, processors, interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings.

This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
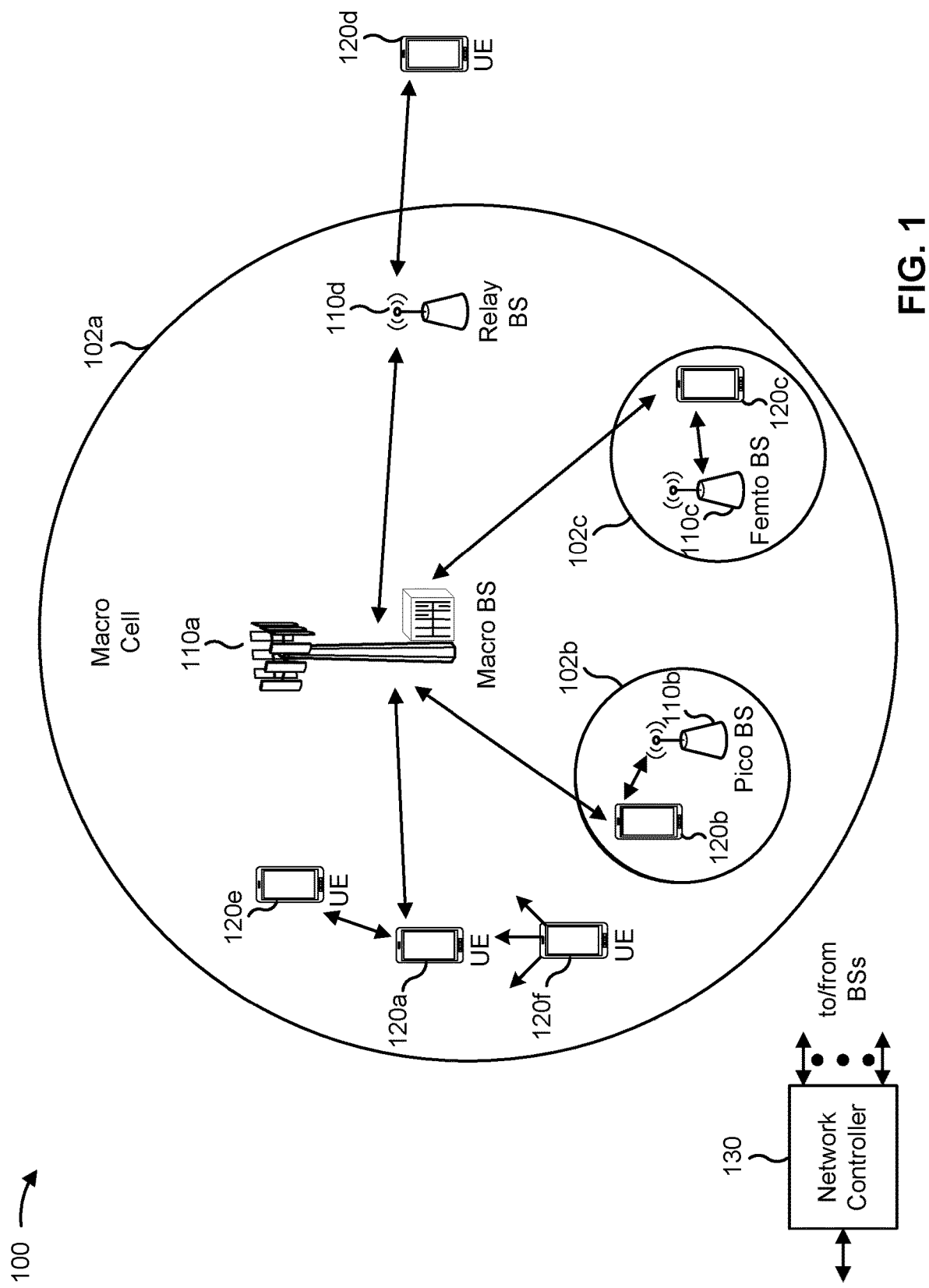
FIG. 1 is a diagram illustrating an example of a wireless network, in accordance with the present disclosure.

FIG. 1 is a diagram illustrating an example of a wireless network 100 in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, or a transmit receive point (TRP). Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, or a virtual network using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, or a relay.

Wireless network 100 may be a heterogeneous network that includes BSs of different types, such as macro BSs, pico BSs, femto BSs, and/or relay BSs. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internetof-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, and/or an air interface. A frequency may also be referred to as a carrier, and/or a frequency channel. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a, UE 120e, and UE 120f) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-pedestrian (V2P) protocol, or a vehicle-to-infrastructure (V2I) protocol), and/or a mesh network. In this case, the UE 120 may perform scheduling operations, resource selection operations, and/or other operations described elsewhere herein as being performed by the base station 110.

In some aspects, UE 120a may indicate available sidelink resources to UE 120e, and the UE 120e may select a sidelink resource for transmission from these available sidelink resources. The UE 120e may also sense a sidelink channel to determine which sidelink resources are available. The UE 120e may select a sidelink resource for transmission from the sidelink resources that UE 120a indicates as available and/or from the sidelink resources that UE 120e senses are available. In some aspects, the UE 120a may schedule one or more preferred sidelink resources on behalf of the UE 120e. According to various aspects described herein, UE 120a may indicate available sidelink resources and/or schedule sidelink resources based at least in part on overhearing availability reports that are broadcast from other UEs, such as UE 120f.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
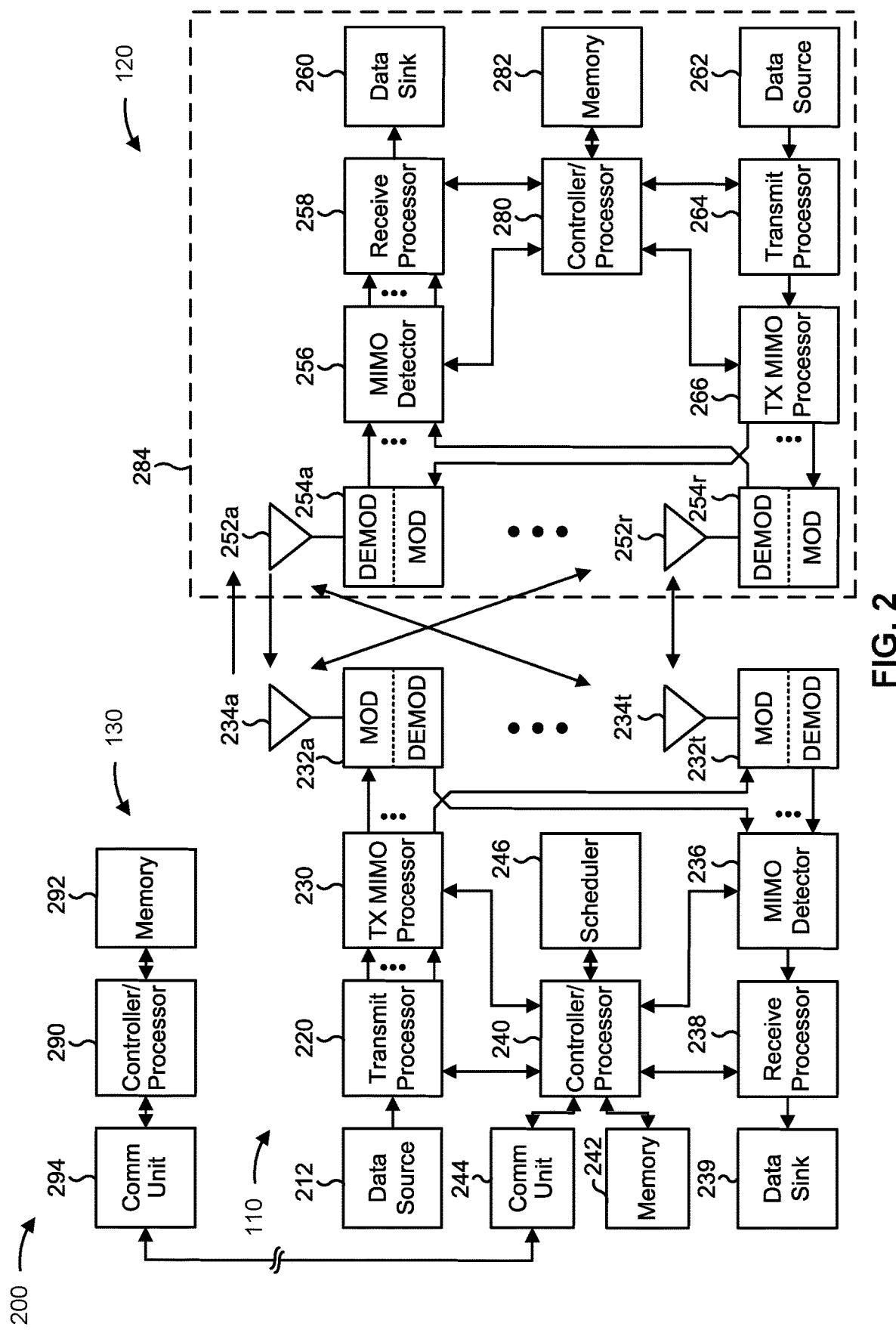
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, upper layer signaling) and provide overhead symbols and control symbols. Transmit processor 220 may also generate reference symbols for reference signals (e.g., a cell-specific reference signal (CRS), a demodulation reference signal (DMRS)) and synchronization signals (e.g., the primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 4-15).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 4-15).

Controller/processor 280 of UE 120 and/or any other component(s) of FIG. 2 may perform one or more techniques associated with broadcasting an indication of sidelink resources, as described in more detail elsewhere herein. For example, controller/processor 280 of UE 120 and/or any other component(s) of FIG. 2 may perform or direct operations of, for example, process 1200 of FIG. 12, process 1300 of FIG. 13, and/or other processes as described herein. Memory 282 may store data and program codes for UE 120, respectively. In some aspects, memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the UE 120, may cause the one or more processors and/or the UE 120 to perform or direct operations of, for example, process 1200 of FIG. 12, process 1300 of FIG. 13, and/or other processes as described herein. In some aspects, executing instructions may include running the instructions, converting the instructions, compiling the instructions, and/or interpreting the instructions, among other examples.

In some aspects, a first UE (e.g., UE 120) includes means for receiving, in a first broadcast message from a second UE, an indication of one or more sidelink resources in a resource selection window of a sidelink channel that are available for transmission by the second UE to a third UE, means for sensing the sidelink channel, means for selecting one or more candidate sidelink resources that are available for a fourth UE to use for transmission to the first UE based at least in part on the indication in the broadcast message and the sensing of the sidelink channel, and/or means for transmitting, to the fourth UE in a second broadcast message, an indication of the one or more candidate sidelink resources that are available for the fourth UE. The means for the first UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the first UE includes means for selecting one or more candidate sidelink resources, from within a resource selection window after sensing a sidelink channel, that are available for a second UE to use for transmission to the first UE, and/or means for transmitting, in a broadcast message, an indication of the one or more candidate sidelink resources. The means for the first UE to perform operations described herein may include, for example, one or more of antenna 252, demodulator 254, MIMO detector 256, receive processor 258, transmit processor 264, TX MIMO processor 266, modulator 254, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
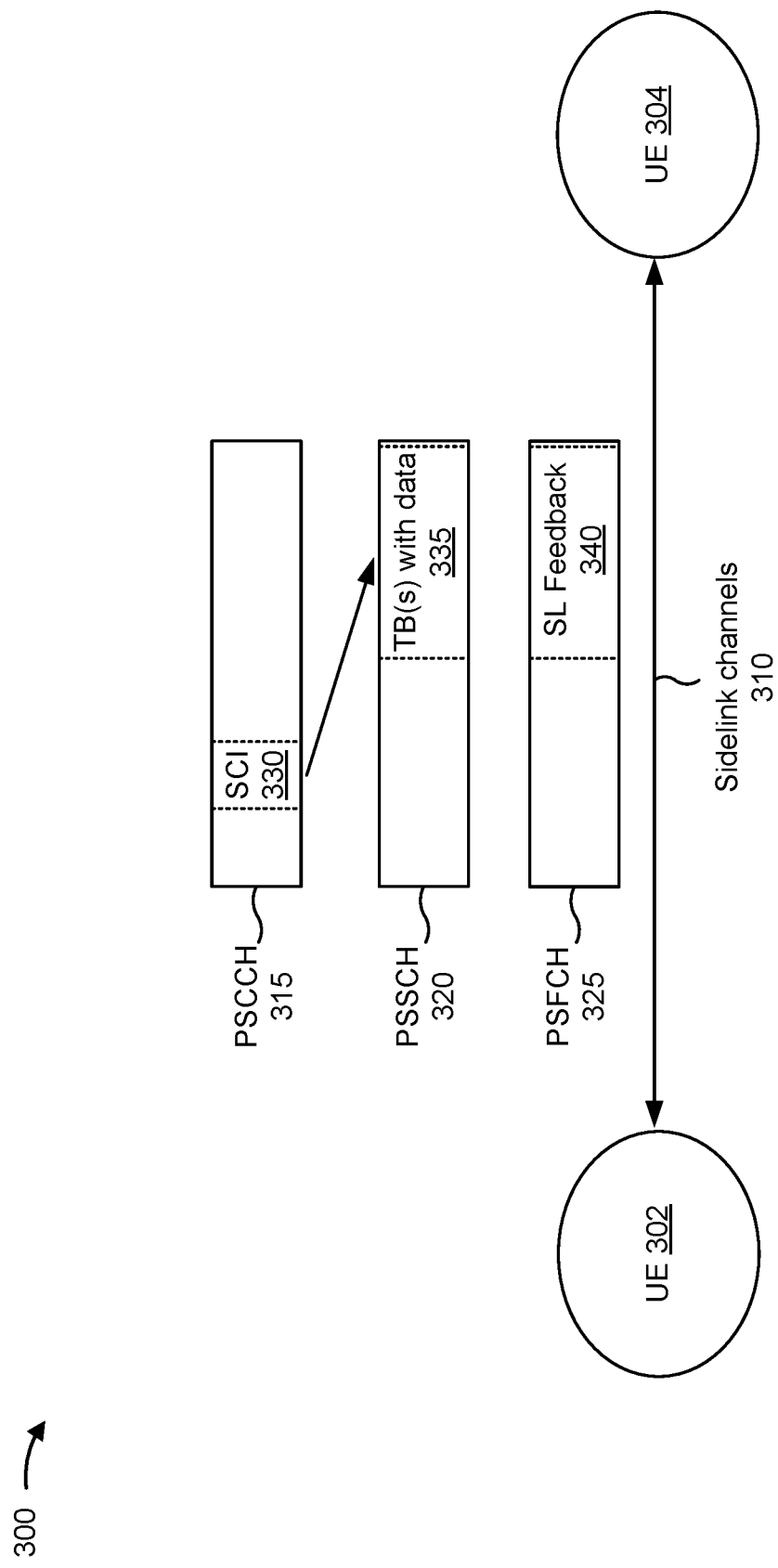
FIG. 3 is a diagram illustrating an example of sidelink communications, in accordance with the present disclosure.

FIG. 3 is a diagram illustrating an example 300 of sidelink communications, in accordance with the present disclosure.

As shown in FIG. 3, a first UE 302 may communicate with a second UE 304 (and one or more other UEs) via one or more sidelink channels 310. UE 302 and UE 304 may communicate using the one or more sidelink channels 310 for P2P communications, D2D communications, V2X communications (e.g., which may include V2V communications, V2I communications, and/or V2P communications) and/or mesh networking. In some aspects, UE 302 and UE 304 may correspond to one or more other UEs. In some aspects, the one or more sidelink channels 310 may use a PC5 interface and/or may operate in a high frequency band (e.g., the 5.9 gigahertz (GHz) band). Additionally, or alternatively, UE 302 and UE 304 may synchronize timing of transmission time intervals (TTIs) (e.g., frames, subframes, slots, or symbols) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station (e.g., base station 110) via an access link or an access channel. The PSSCH 320 may be used to communicate data, similar to a physical downlink shared channel (PDSCH) and/or a physical uplink shared channel (PUSCH) used for cellular communications with a base station via an access link or an access channel. For example, the PSCCH 315 may carry sidelink control information (SCI) 330, which may indicate various control information used for sidelink communications, such as one or more resources (e.g., time resources, frequency resources, and/or spatial resources) where a transport block (TB) 335 may be carried on the PSSCH 320. The TB 335 may include data. The PSFCH 325 may be used to communicate sidelink feedback 340, such as hybrid automatic repeat request (HARQ) feedback (e.g., acknowledgement or negative acknowledgement (ACK/NACK) information), transmit power control (TPC), and/or a scheduling request (SR).

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, UE 304 may operate using a transmission mode where resource selection and/or scheduling is performed by UE 302 (e.g., rather than a base station). In some aspects, UE 302 and/or UE 304 may perform resource selection and/or scheduling by sensing channel availability for transmissions. For example, UE 304 may measure an RSSI parameter (e.g., a sidelink-RSSI (S-RSSI) parameter) associated with various sidelink channels, may measure an RSRP parameter (e.g., a PSSCH-RSRP parameter) associated with various sidelink channels, may measure an RSRQ parameter (e.g., a PSSCH-RSRQ parameter) associated with various sidelink channels, and/or may determine a signal-to-interference ratio (SIR) associated with another UE on a sidelink channel. UE 304 may select a channel for transmission of a sidelink communication based at least in part on the measurement(s).

Additionally, or alternatively, UE 304 may perform resource selection and/or scheduling using SCI 330 received in the PSCCH 315, which may indicate occupied resources and/or channel parameters. Additionally, or alternatively, UE 304 may perform resource selection and/or scheduling by determining a channel busy rate (CBR) associated with various sidelink channels, which may be used for rate control (e.g., by indicating a maximum number of resource blocks that UE 304 can use for a particular set of subframes).

In the transmission mode where resource selection and/or scheduling is performed by UE 302, UE 302 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, and/or an MCS to be used for the upcoming sidelink transmission. In some aspects, UE 302 may generate a sidelink grant that indicates one or more parameters for semi-persistent scheduling (SPS), such as a periodicity of a sidelink transmission. Additionally, or alternatively, UE 302 may generate a sidelink grant for event-driven scheduling, such as for an on-demand sidelink message.

UE 302 and UE 304 may operate in sidelink resource allocation Mode 2, in which UE 302 and UE 304 schedule or reserve their own sidelink resources without the assistance or direction of a base station (Mode 1). In some aspects, UE 302 may indicate available sidelink resources to UE 304, and UE 304 may select a sidelink resource for transmission from these available sidelink resources. UE 304 may also sense one or more of the sidelink channels 310 to determine which sidelink resources are available. UE 304 may select a sidelink resource for transmission from the sidelink resources that UE 302 indicates as available and/or from the sidelink resources that UE 304 senses are available. In some aspects, UE 302 may schedule one or more preferred sidelink resources on behalf of UE 304. According to various aspects described herein, UE 120a may indicate available sidelink resources and/or schedule sidelink resources based at least in part on overhearing availability reports that are broadcast from other UEs.

As indicated above, FIG. 3 is provided as an example. Other examples may differ from what is described with regard to FIG. 3.

Figure 4:
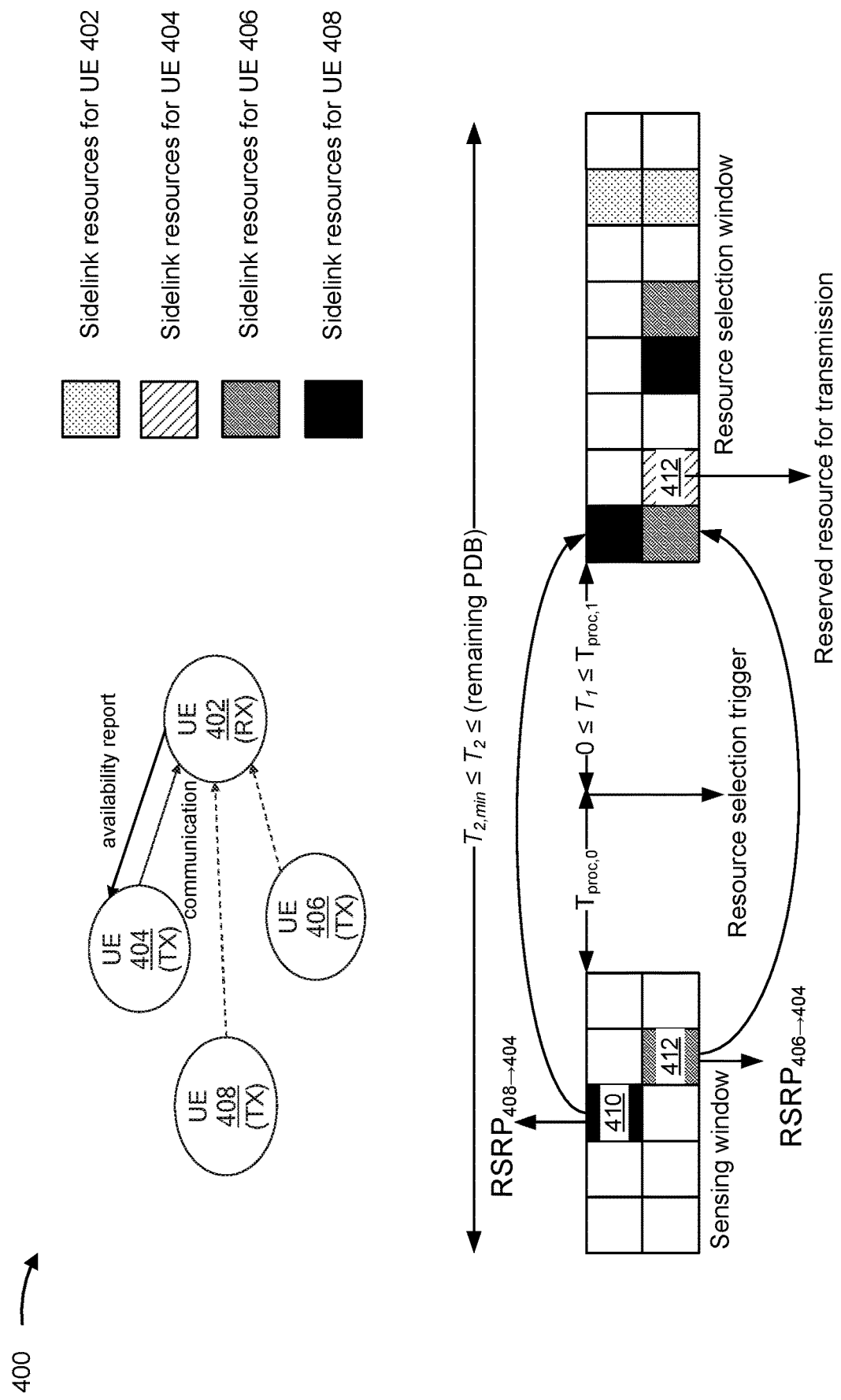
FIG. 4 is a diagram illustrating an example of selecting sidelink resources, in accordance with the present disclosure.

FIG. 4 is a diagram illustrating an example 400 of selecting sidelink resources, in accordance with the present disclosure. Example 400 shows a UE 402 (e.g., a UE 302) that may receive communications on a sidelink channel from other UEs (e.g., a UE 304), such as UE 404, UE 406, and/or UE 408.

As described in connection with FIGS. 4-9, UE 404 is a transmitting UE that is transmitting communications to UE 402, which is a receiving UE. UE 404 may use a report from UE 402, which may act as a reporting UE that reports available sidelink resources. Example 400 shows an availability report from UE 402 to UE 404 and a communication from UE 404 to UE 402.

If UE 404 is to transmit a communication to UE 402, UE 404 may sense the sidelink channel in a sensing window to determine which sidelink resources (e.g., subcarriers, subchannels) are available. A sidelink resource may be considered available if the sidelink resource was clear or had a signal energy (e.g., RSRP) that satisfied an availability threshold (e.g., measured interference or energy on the channel is lower than a maximum decibel-milliwatts (dBm) or dB, RSRP threshold). The availability threshold may be configured per transmission priority and receive priority pair. UE 404 may measure DMRSs on a PSCCH or a PSSCH, according to a configuration.

For example, UE 404 may prepare to transmit a communication to UE 402. UE 404 may have already sensed previous sidelink resources and successfully decoded SCI from UE 406 and UE 408. UE 404 may try to reserve sidelink resources, and thus may check the availability of the future sidelink resources reserved by UE 406 and UE 408 by sensing the sidelink channel in the sensing window. UE 404 may measure an RSRP of a signal from UE 408 in sidelink resource 410, and an RSRP of a signal from UE 406 in sidelink resource 412. If an observed RSRP satisfies the RSRP threshold (e.g., is lower than a maximum RSRP), the corresponding sidelink resource may be available for reservations by UE 404. UE 404 may reserve the sidelink resource (which may be a random selection from available resources). For example, UE 404 may select and reserve sidelink resource 412 for transmission. This may be in a time slot after which UE 406 and UE 408 had used sidelink resources, and UE 404 may have sensed these sidelink resources earlier.

There may be a resource selection trigger to trigger selection of sidelink resources after a processing time $T_{proc,0}$, and before another processing time $T_{proc,1}$, before a resource selection window from which sidelink resources are available. The resource selection window may be a time window from which sidelink resources may be selected, and the resource selection window may extend for a remaining packet delay budget (PDB).

UE 404 may be power-sensitive and thus may not afford to continually sense all of the sidelink resources. UE 402 may be more capable of sensing and reporting on the sidelink resources because, for example, UE 402 may be a smart phone while UE 402 may be a smart watch. UE 402 may receive unicast communications from UE 404, and UE 402 may report back available resources to UE 404. UE 402 may continually sense the sidelink resources and measure interference levels involving neighboring UEs. For example, UE 402 may measure an RSRP of a signal from neighboring UE 406 as −92 dBm and an RSRP of a signal from neighboring UE 408 as −102 dBm. For a signal of a last transmission of UE 404, UE 402 may measure a target signal level with an RSRP that was −90 dBm. UE 402 may estimate an SIR of a signal between UE 402 and UE 404 as −90−(−92)=2 dB and an SIR between UE 404 and UE 408 as −90−(−102)=12 dB. If the SIR of a signal from UE 404 to UE 402 with interference from UE 408 is large enough (satisfies an availability threshold) for reliable communication between UE 402 and UE 404, UE 402 may mark a sidelink resource that was reserved by UE 408 as available for use for a communication from UE 404 to UE 402. This may be useful when UE 404 has more than one data stream with varying Quality of Service (QoS) requirements or transmissions with different MCS indices.

As indicated above, FIG. 4 is provided as an example. Other examples may differ from what is described with regard to FIG. 4.

Figure 5:
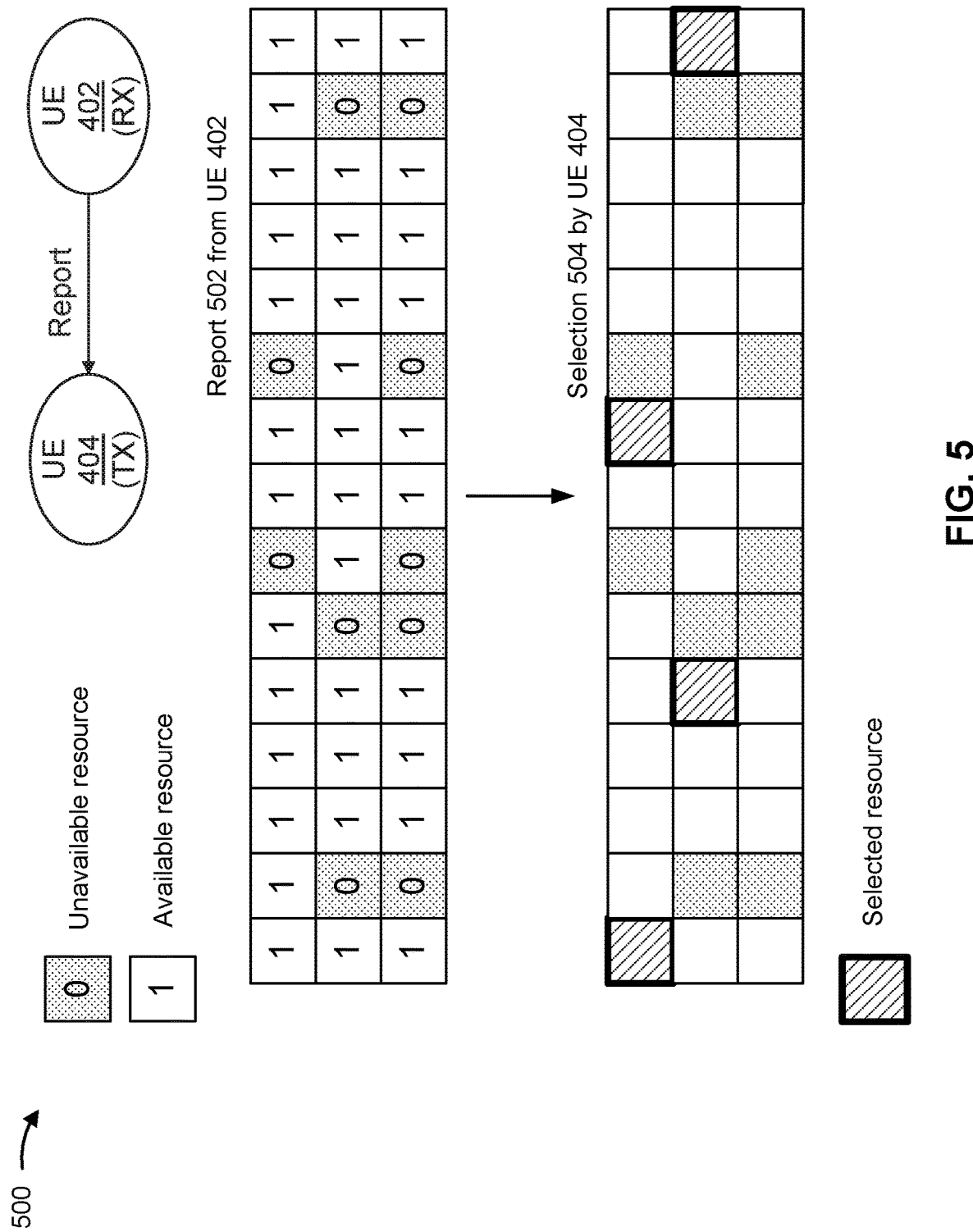
FIG. 5 is a diagram illustrating an example of using a resource report for sidelink resources, in accordance with the present disclosure.

FIG. 5 is a diagram illustrating an example 500 of using a resource report for sidelink resources, in accordance with the present disclosure. Example 500 shows that UE 402 may transmit a report to UE 404.

UE 402 may transmit a report 502 indicating an availability of each sidelink resource. Rows in the report 502 may represent subcarriers or subchannels, and columns may represent time units (e.g., slots, symbols). The report 502 may be a binary report, such as a bitmap. For example, UE 402 may report a 1 bit for available and a 0 bit for unavailable. UE 404 may decode the report 502 and select (e.g., randomly) N resources from the available sidelink resources for potential N transmissions of a newly generated packet, or a packet of a transport block that has not been transmitted before. As shown by selection 504, UE 404 may select N=4 sidelink resources from the available sidelink resources indicated by the report 502.

As indicated above, FIG. 5 is provided as an example. Other examples may differ from what is described with regard to FIG. 5.

Figure 6:
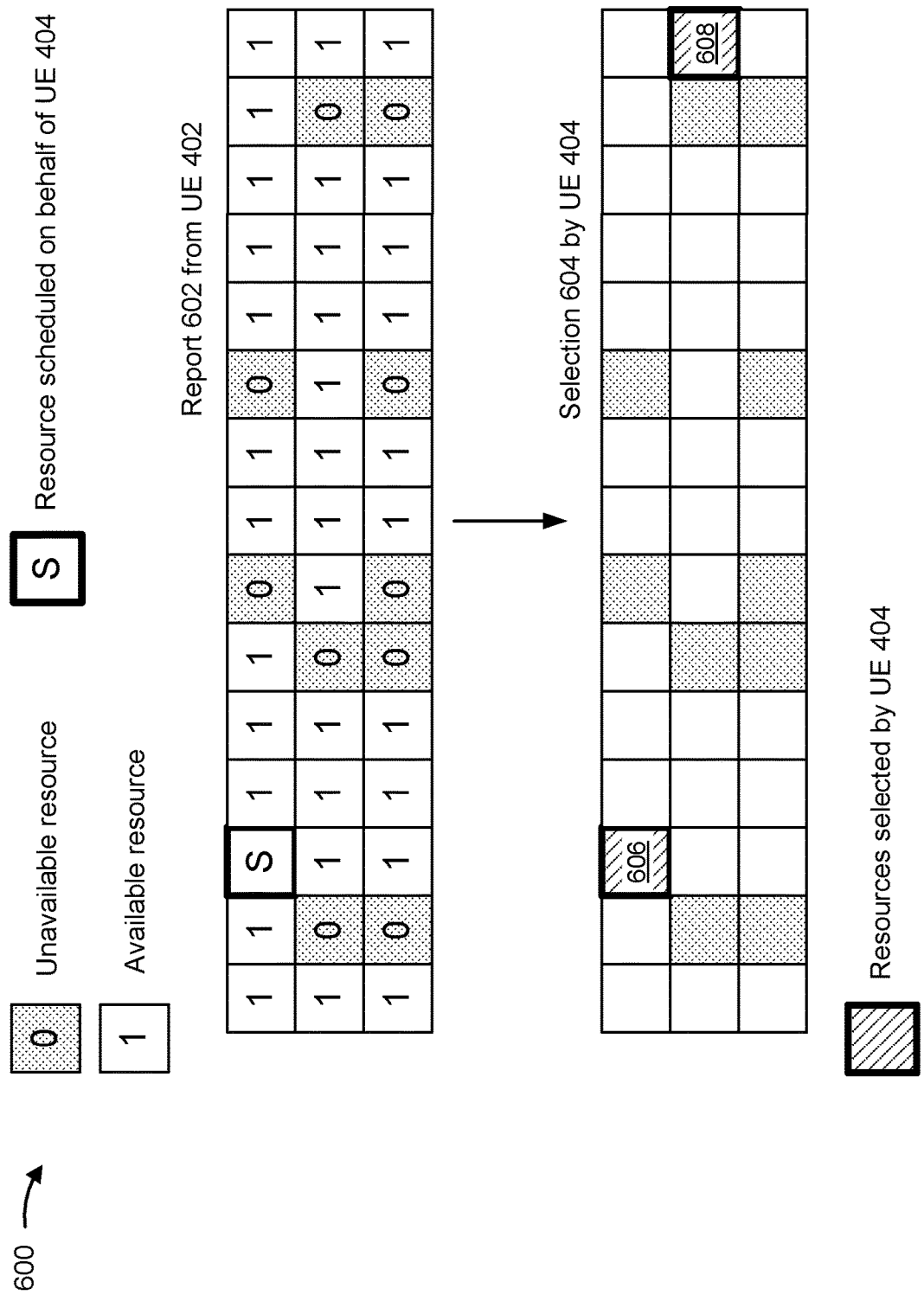
FIG. 6 is a diagram illustrating an example of indicating and using scheduled sidelink resources, in accordance with the present disclosure.

FIG. 6 is a diagram illustrating an example 600 of indicating and using scheduled sidelink resources, in accordance with the present disclosure.

UE 402 may prefer that UE 404 use sidelink resources with lower expected interference levels over other sidelink resources. If so, according to various aspects described herein, UE 402 may schedule one or more sidelink resources on behalf of UE 404 when indicating available sidelink resources to UE 404. UE 402 may still allow UE 404 to select other sidelink resources from the remaining available sidelink resources. By scheduling preferred sidelink resources for UE 404 that are available, UE 402 may cause UE 404 to conserve power, processing resources, and signaling resources because UE 404 performs less sensing and scheduling of sidelink resources. UE 404 may still have flexibility to sense the sidelink channel and select sidelink resources to avoid interference or collisions that degrade communications, which conserves power, processing resources, and signaling resources that would otherwise be wasted on failed transmissions and retransmissions.

For example, UE 404 may be configured to make a maximum of N transmissions for a packet or for a transport block. UE 402 may sense the channel and select a set of candidate sidelink resources in the resource selection window of UE 404 for the N transmissions. Within the set of candidate sidelink resources, UE 402 may select and schedule M scheduled sidelink resources, where M may be 0 or up to N of the candidate sidelink resources (0≤M≤N) of UE 404. Example 600 shows a report 602 from UE 402 indicating the set of candidate sidelink resources (resources marked with a "1"). The report 602 also indicates a scheduled sidelink resource (resource marked with "S") that UE 402 has scheduled for UE 404 based at least in part on sensing the sidelink channel and detecting lower interference for the scheduled sidelink resource.

In some aspects, if M is less than N, UE 404 may select other sidelink resources from the set of candidate sidelink resources for any remaining transmissions up to N (N-M sidelink resources for N-M transmissions). As shown by selection 604, UE 404 may select the scheduled sidelink resource 606 for a first transmission and select another candidate sidelink resource 608 for a second transmission. If M=0, then report 602 may be similar to a report that is regularly transmitted.

In some aspects, UE 404 may sense the channel, and based at least in part on sensing the sidelink channel and measuring interference from the location of UE 404, may not use the scheduled candidate sidelink resource indicated in the report 602. Rather, UE 404 may select another candidate sidelink resource indicated as available in the report 602.

In some aspects, if M=N, UE 402 may indicate N scheduled sidelink resources by listing the respective indices of the N scheduled sidelink resources in the corresponding resource selection window of UE 404. UE 402 may send availability information in addition to the indices of the N scheduled sidelink resources. The additional availability information may include an indication of available candidate sidelink resources, which gives UE 404 flexibility to alter some selections from any scheduled sidelink resources indicated by UE 402. For example, if UE 404 senses the sidelink channel partially or fully, UE 404 may combine its own sensing results with the additional availability information from UE 402, in order to have a better picture of sidelink channel availability.

UE 404 may use the report 602 for an initial transmission of a transport block. For example, UE 404 may have received an indication of M=1 scheduled sidelink resource in the report 602 for an initial transmission of a transport block and a set of candidate sidelink resources in the form of a resource availability list or bitmap, as shown in FIG. 6. Then, UE 404 may make its initial transmission on the scheduled sidelink resource and have freedom to select from among the remaining candidate sidelink resources that are indicated as available in the report 602 from UE 402 to make remaining N−1 re-transmissions if needed. By using the scheduled sidelink resource indicated in the report 602 for the initial transmission for the transport block, the UE 404 may have a better chance of avoiding interference or a collision with the initial transmission, which may occur without prior knowledge of a preferred sidelink resource.

As indicated above, FIG. 6 is provided as an example. Other examples may differ from what is described with regard to FIG. 6.

Figure 7:
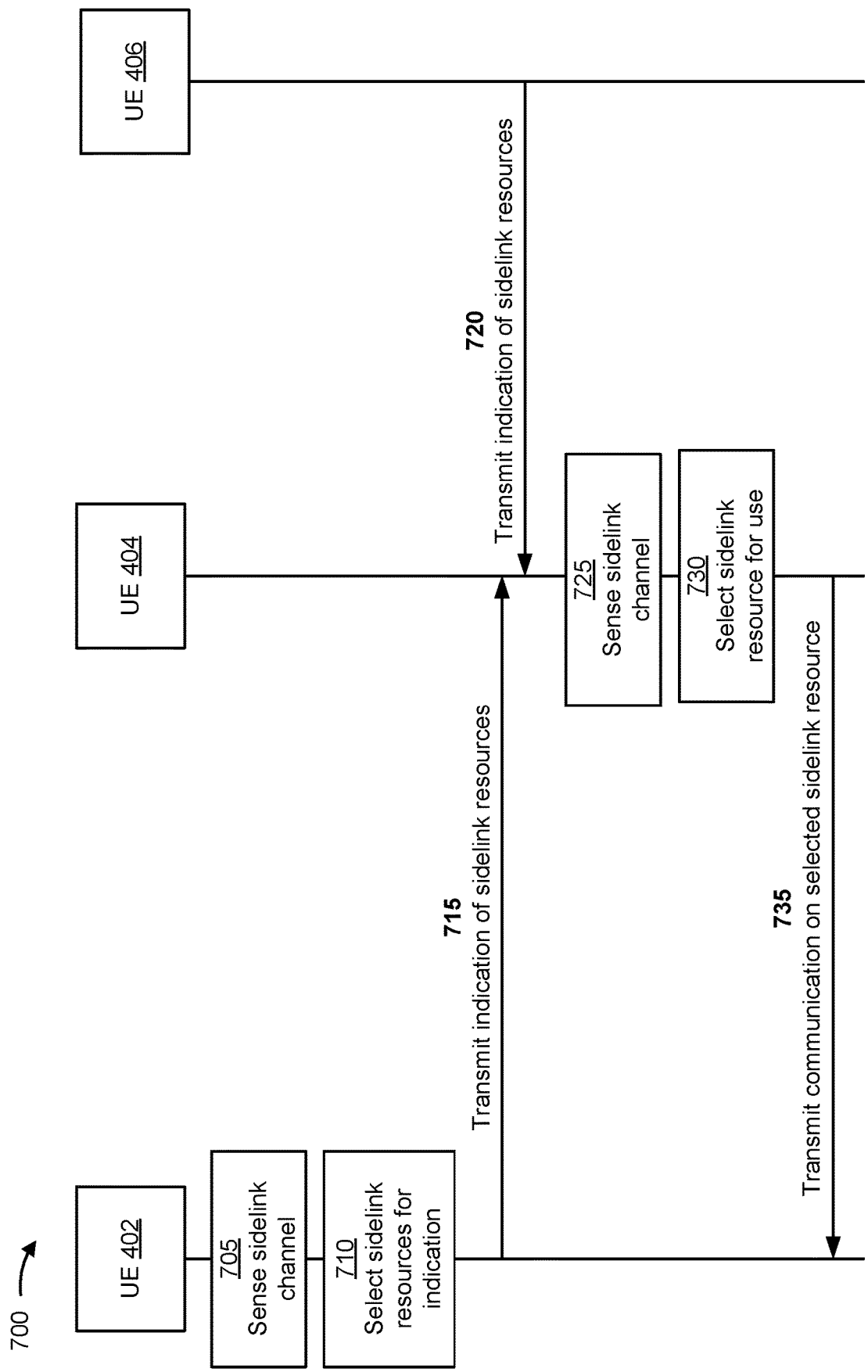
FIG. 7 is a diagram illustrating an example of indicating and using sidelink resources, in accordance with the present disclosure.

FIG. 7 is a diagram illustrating an example 700 of indicating and using sidelink resources, in accordance with the present disclosure. Example 700 shows that UE 402, UE 404, and UE 406 may communicate with each other via one or more sidelink communications. In some aspects, UE 402, UE 404, and/or UE 406 may communicate (e.g., transmit an uplink transmission and/or receive a downlink transmission) with a base station. UE 402, UE 404, UE 406, and any base station may be part of a wireless network (e.g., wireless network 100). As described in connection with FIGS. 4-6, UE 404 is the reporting UE, and UE 402 is the UE transmitting a communication.

As shown by reference number 705, UE 402 may sense a sidelink channel in a sensing window for UE 404 (e.g., using antenna 252, demodulator 254, MIMO detector 256, receive processor 258, controller/processor 280, and/or memory 282). UE 402 may sense the sidelink channel based at least in part on past sidelink resources used by UE 404 or other UEs and/or future reserved sidelink resources for UE 404 or other UEs. As shown by reference number 710, UE 402 may select candidate sidelink resources that are clear or at least satisfy an availability threshold (e.g., minimum SIR) and generate an indication (e.g., report, list, bitmap) of the candidate sidelink resources (e.g., using controller/processor 280 or memory 282). UE 402 may also select one or more preferred sidelink resources for UE 404 and schedule the one or more of the preferred sidelink resources for UE 404. UE 402 may mark the scheduled sidelink resources in the indication.

As shown by reference number 715, UE 402 may transmit the indication via a radio resource control (RRC) message, a medium access control control element (MAC-CE), and/or downlink control information (DCI) (e.g., using antenna 252, transmit processor 264, TX MIMO processor 266, modulator 254, controller/processor 280, and/or memory 282). In some aspects, as shown by reference number 720, UE 404 may receive an indication of reserved and/or available sidelink resources from another reporting UE, such as UE 406 (e.g., using antenna 252, demodulator 254, MIMO detector 256, receive processor 258, controller/processor 280, and/or memory 282). The indications from UE 402 and UE 406 may be in unicast transmissions to UE 404.

As shown by reference number 725, UE 404 may (optionally) sense the sidelink channel for scheduled sidelink resources indicated by UE 402, other candidate sidelink resources indicated by UE 402, reserved sidelink resources indicated by UE 406, and/or any available sidelink resources indicated by UE 406 (e.g., using antenna 252, demodulator 254, MIMO detector 256, receive processor 258, controller/processor 280, and/or memory 282). As shown by reference number 730, UE 404 may select sidelink resources from available sidelink resources indicated by UE 402 (e.g., using controller/processor 280 and/or memory 282). UE 404 may use a scheduled sidelink resource indicated by UE 402. For any remaining transmissions, UE 404 may select other candidate sidelink resources indicated by UE 402. UE 404 may take into account any reserved sidelink resources or available sidelink resources indicated by UE 406. As shown by reference number 735, UE 404 may transmit a communication to UE 402 on a selected sidelink resource (e.g., using antenna 252, transmit processor 264, TX MIMO processor 266, modulator 254, controller/processor 280, and/or memory 282). UE 404 may transmit other communications to UE 402 with other selected sidelink resources.

In some aspects, availability information from UE 406 may conflict with availability information from UE 402, and conflicted sidelink resources may include the scheduled sidelink resources and/or other candidate sidelink resources indicated by UE 402. For example, UE 402 may indicate that a sidelink resource on the sidelink channel is available as a candidate sidelink resource, but UE 406 may indicate that the sidelink resource is not available. The sidelink resource may have interference or may be reserved. That is, some conflicts may exist for sidelink resources that are not disjoint in a time-frequency grid of a resource pool.

In some aspects, UE 404 may deduce the availability of sidelink resources by combining availability information (e.g., binary reports) from multiple UEs. For example, UE 404 may perform a resource-wise AND operation such that a sidelink resource is considered available if it is indicated as available by both UE 402 and UE 406. For a sidelink resource with differing availability per UE (resource conflict), UE 404 has two options. In one option, UE 404 may consider a scheduled sidelink resource indicated by UE 402 as unavailable in order to protect the scheduled sidelink resource from a possible collision due to a missed reservation by UE 402. UE 404 may not transmit a communication in the scheduled sidelink resource. In a second option, UE 404 may consider the scheduled sidelink resource as available and proceed with transmitting a communication in the scheduled sidelink resource based at least in part on sensing results rendering an interference level that satisfies the availability threshold, locations of UE 402 and/or UE 406 with respect to UE 404, and/or a network layout of UE 402 and/or UE 406 with respect to UE 404. That is, UE 404 may use information about the UE locations and the network layout to determine that the scheduled sidelink resource will not be interfered with and may use the scheduled sidelink resource.

In some aspects, if there is a conflict with scheduled sidelink resources and/or candidate sidelink resources, UE 404 may resolve a conflict and/or prioritize the scheduling sidelink resources of different UEs in various ways. For example, UE 404 may compare priorities of packets destined for each destination UE and use the sidelink resource scheduled by the UE whose packet has the highest priority. UE 404 may compare remaining PDBs of corresponding packets for each UE destination and use the scheduled sidelink resource for the packet with the shortest remaining PDB.

In some aspects, UE 404 may select a sidelink resource based at least in part on an application of a fairness rule between the UEs. For example, UE 404 may alternate between reporting UEs to select a different UE's scheduled sidelink resource at a given time (e.g., round-robin selection). UE 404 may compare a buffer status corresponding to each flow destined to the reporting UEs. For example, UE 404 may prefer using the sidelink resource for the longest queue.

In some aspects, UE 404 may use sidelink channel state information (SL-CSI) report values from conflicting reporting UEs. For example, UE 404 may prioritize a sidelink resource with a weaker link. UE 404 may select a sidelink resource based at least in part on a path loss, distance estimations between UE 404 and other reporting UEs (e.g., UE 402, UE 406, UE 408), and/or zone identifiers (IDs) for the reporting UEs. For example, UE 404 may prioritize using a sidelink resource having a higher path loss and/or a greater distance.

In some aspects, UE 404 may consider reliability requirements on each link to the reporting UEs. For example, UE 404 may select a sidelink resource of a link with a higher reliability than other links. UE 404 may consider power control levels used on each link. For example, UE 404 may select a sidelink resource of a link with a lower power level for a conflicted sidelink resource. UE 404 may consider a utilization state of a feedback message, such as a HARQ-ACK on flows to the reporting UEs. For example, UE 404 may select a sidelink resource of a flow that uses blind transmissions (non-HARQ-ACK). UE 404 may consider communication range requirements on each link. For example, UE 404 may select a sidelink resource having a longer range requirement than range requirements of other sidelink resources. UE 404 may consider a cast type (e.g., unicast, broadcast) of communications for each flow. For example, UE 404 may prioritize sidelink resources associated with one of the cast types. In other words, UE 404 may have various options for resolving sidelink resource conflicts between UEs.

As indicated above, FIG. 7 is provided as an example. Other examples may differ from what is described with regard to FIG. 7.

Figure 8:
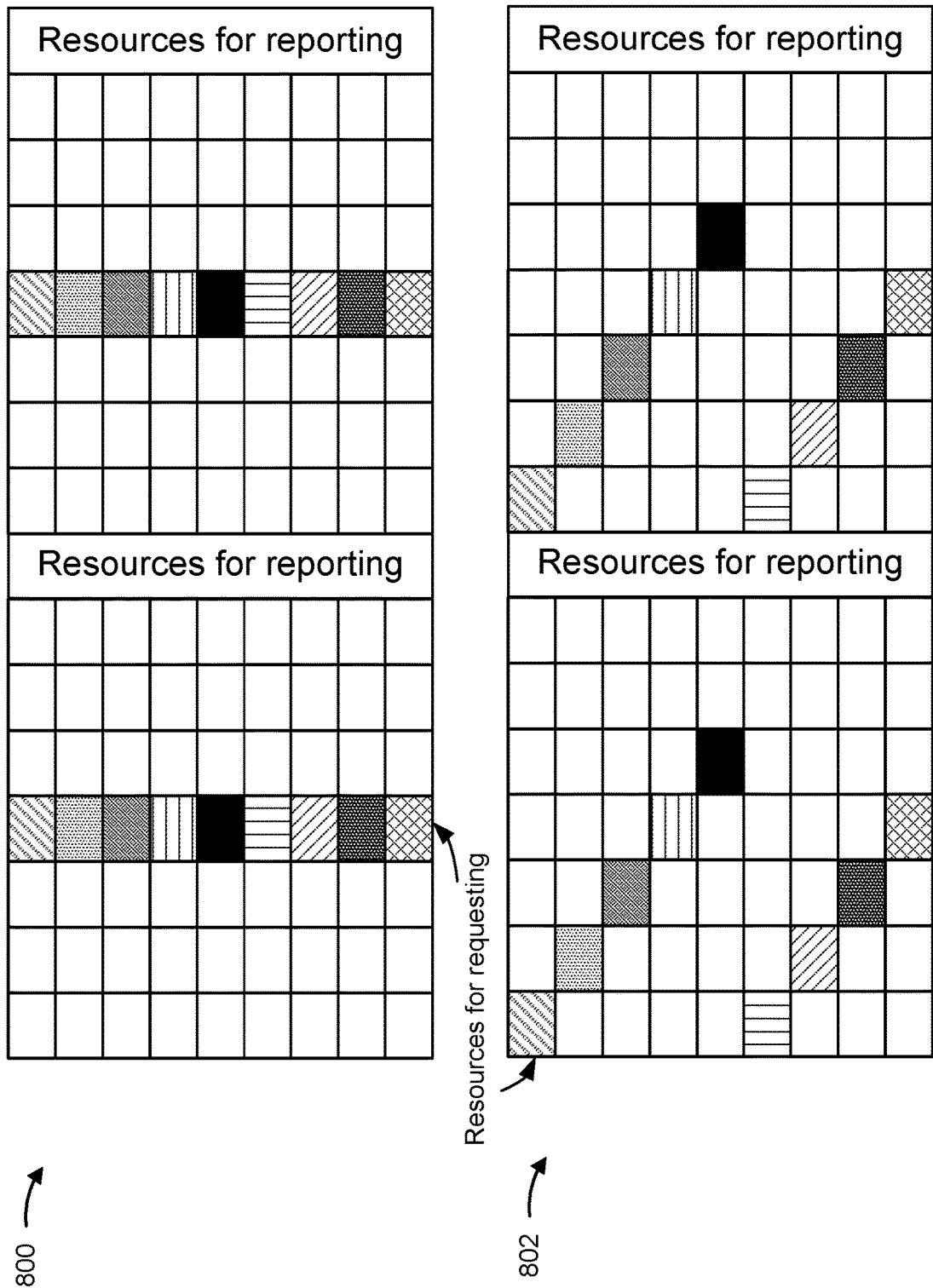
FIG. 8 is a diagram illustrating examples of resources for requesting and reporting, in accordance with the present disclosure.

FIG. 8 is a diagram illustrating examples 800 and 802 of resources for requesting and reporting, in accordance with the present disclosure.

A UE may be configured to use certain resources for requesting resources and/or for reporting. Example 800 shows resources for requesting transmissions and/or reports. The resources for requesting are configured with a certain periodicity. The resources for reporting may also have a periodicity. Example 800 shows the resources for requesting in one sidelink slot, while example 802 shows the resources for reporting that are distributed over multiple sidelink slots. Each request resource may be in a single subchannel or in multiple subchannels.

As indicated above, FIG. 8 provides some examples. Other examples may differ from what is described with regard to FIG. 8.

Figure 9:
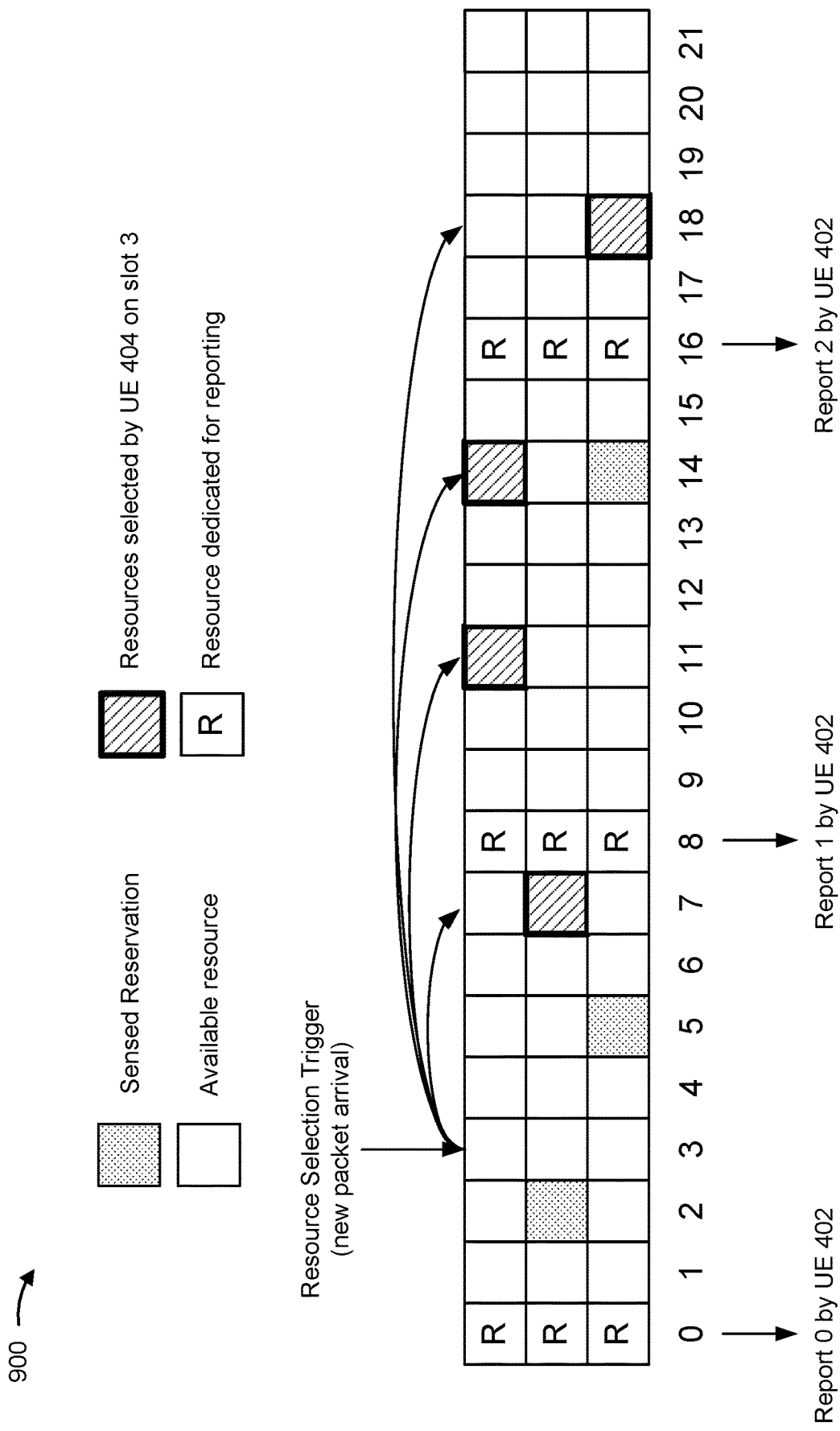
FIG. 9 is a diagram illustrating an example of indicating sidelink resources, in accordance with the present disclosure.

FIG. 9 is a diagram illustrating an example 900 of indicating sidelink resources, in accordance with the present disclosure. Example 900 shows time and frequency sidelink resources (e.g., frequency subchannels and time slots) that may be marked as scheduled. A reporting period may be 8 slots.

UE 402 may have information of a periodic pattern for arrival of new packets with respect to UE 404. For example, a new packet of a transport block may arrive in slot 3 (as a resource selection trigger). UE 402 may also have information that UE 404 is going to use a Report 0 from UE 402 at slot 0 for an initial resource selection for the transport block. Accordingly, UE 402 may mark a subset of resources in Report 0, but not in Report 1 or Report 2. Therefore, there may be no scheduled resources indicated in Report 1 or Report 2, because only Report 0 applies to slot 3. UE 404 may then make 4 sidelink resource selections based at least in part on the Report 0 received in slot 0. In other words, UE 402 may use periodicity information for UE 404 to mark candidate sidelink resources and/or scheduled sidelink resources. If traffic at UE 404 is periodic, then the reporting of UE 402 may also be periodic. In this scenario, UE 402 may schedule (mark) resources only when UE 402 expects that UE 404 is going to use the scheduled resources for a newly generated packet. Therefore, the scheduling of resources may be selective and apply to only a subset of reports in time. This conserves signaling resources.

If traffic at UE 404 is aperiodic, UE 404 may request a sidelink resource availability report from UE 402. UE 402 may use requests from UE 404 as triggering events to schedule sidelink resources for UE 404. When there is no request, UE 402 may still generate a report due to some other triggering event (e.g., mobility operations, change in UE status, traffic conditions) and may leave some candidate sidelink resources unscheduled (unmarked) so that UE 404 may select other candidate sidelink resources if there is a need (e.g., for retransmissions).

As indicated above, FIG. 9 is provided as an example. Other examples may differ from what is described with regard to FIG. 9.

Figure 10:
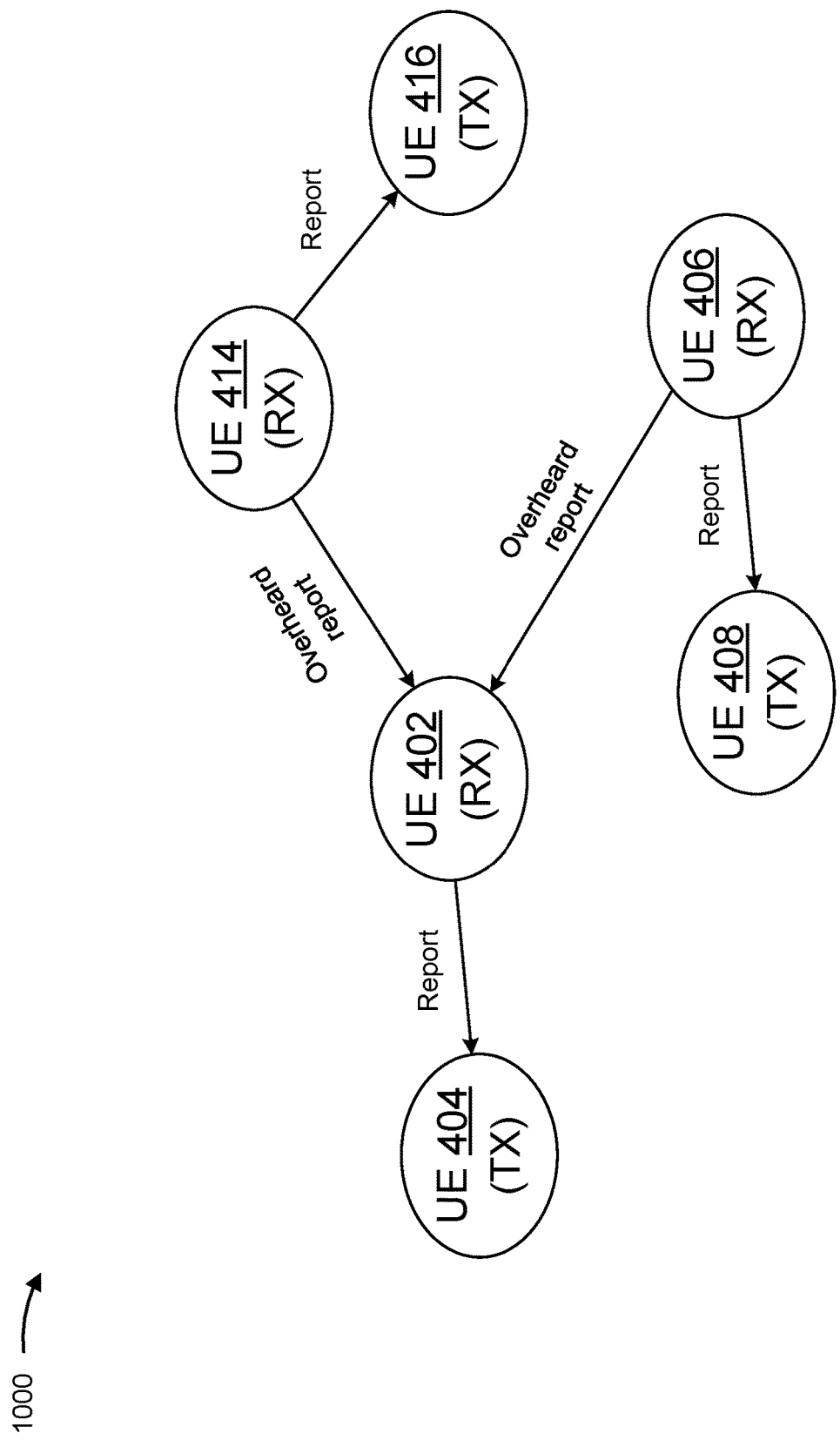
FIG. 10 is a diagram illustrating an example of overhearing availability reports, in accordance with the present disclosure.

FIG. 10 is a diagram illustrating an example 1000 of overhearing availability reports, in accordance with the present disclosure. Example 1000 shows reporting UE 402, reporting UE 406, and reporting UE 414 that may provide sidelink resource availability reports to transmitting UE 404, transmitting UE 408, and transmitting UE 416, respectively.

A prominent source of transmission collisions for transmitting UE 404, transmitting UE 406, and transmitting UE 414 is an initial transmission of a transport block. This is because, although retransmissions subsequent to the initial transmission can be reserved and signaled to a transmitting UE, the initial transmission may not be reserved. If UE 402 and UE 404 select sidelink resources in close proximity to another pair of UEs, such as UE 406 and UE 408, or UE 414 and UE 416, UE 402 may not know sidelink resource selections for UE 408 or UE 416 until the initial transmissions. For example, when UE 406 transmits an availability report in a unicast session to UE 408, UE 402 may not have any information about sidelink resources that UE 406 has indicated as available or scheduled for UE 408. This may result in a high probability of collisions. Collisions cause a UE to waste power, processing resources, and scheduling resources.

According to various aspects described herein, UE 406 and UE 414 may transmit indications of candidate sidelink resources and scheduled sidelink resources in broadcast messages. In this way, UE 402 may overhear these reports and select sidelink resources for UE 404 based at least in part on indications of candidate sidelink resources and scheduled sidelink resources from other reporting UEs. For example, UE 402 may avoid sidelink resources scheduled by other reporting UEs if UE 402 determines there may be interference on those sidelink resources. UE 402 may mark such sidelink resources as unavailable in a report by UE 402. UE 402 may consider sidelink resources previously scheduled for another reporting UE and reuse such sidelink resources. UE 402 may ignore other UE reports and still use a sidelink resource scheduled by another UE if UE 402 determines there may not be sufficient interference. Furthermore, UE 402 may have missed some sidelink resource reservations that are captured by a nearby reporting UE. In other words, by using availability information broadcast by other UEs, UE 402 may form a more accurate, composite report of available sidelink resources for UE 404. As a result, UE 404 may conserve power, processing resources, and signaling resources that may otherwise be consumed by failed communications and retransmissions.

As indicated above, FIG. 10 is provided as an example. Other examples may differ from what is described with regard to FIG. 10.

Figure 11:
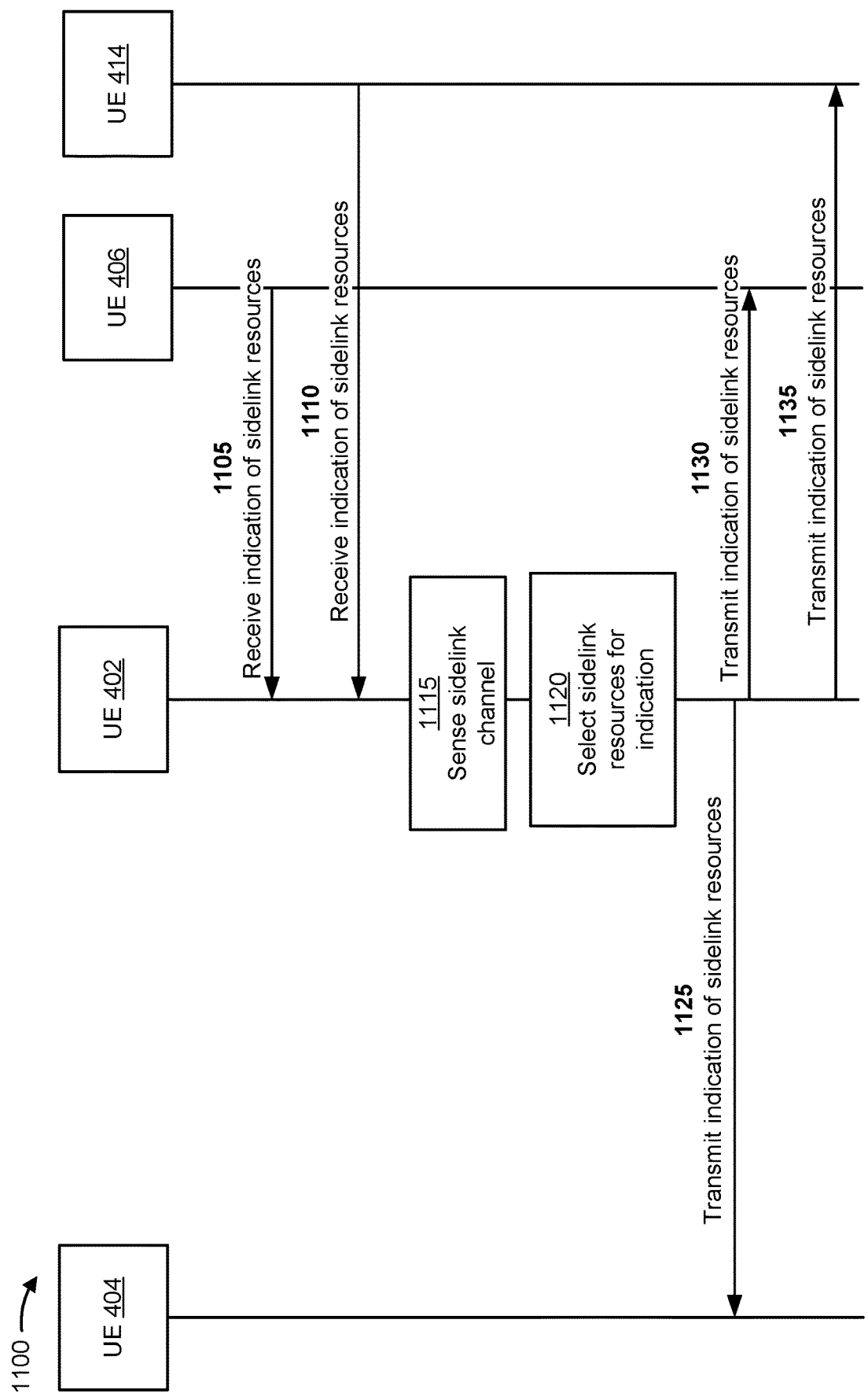
FIG. 11 is a diagram illustrating an example of broadcasting and using indications of sidelink resources, in accordance with the present disclosure.

FIG. 11 is a diagram illustrating an example 1100 of broadcasting and using indications of sidelink resources, in accordance with the present disclosure. Example 1100 shows that UE 402 and UE 404 may communicate with each other. UE 406 and UE 408 may be reporting UEs that transmit broadcast messages that UE 402 may receive. UE 402, UE 404, UE 406, UE 414, and one or more base stations may be part of a wireless network (e.g., wireless network 100).

As shown by reference number 1105, UE 406 may broadcast, and UE 402 may receive, an indication of sidelink resources that are available or scheduled by UE 406 (e.g., using antenna 252, transmit processor 264, TX MIMO processor 266, modulator 254, demodulator 254, MIMO detector 256, receive processor 258, controller/processor 280, and/or memory 282). As shown by reference number 1110, UE 414 may broadcast, and UE 402 may receive, an indication of sidelink resources that are available or scheduled by UE 406 (e.g., using antenna 252, transmit processor 264, TX MIMO processor 266, modulator 254, demodulator 254, MIMO detector 256, receive processor 258, controller/processor 280, and/or memory 282).

As shown by reference number 1115, UE 402 may sense a sidelink channel in a sensing window for UE 404 (e.g., using antenna 252, demodulator 254, MIMO detector 256, receive processor 258, controller/processor 280, and/or memory 282). UE 402 may sense the sidelink channel based at least in part on past sidelink resources used by UE 404, sidelink resources indicated in broadcast messages by other UEs, and/or future reserved sidelink resources for UE 404 or other UEs. As shown by reference number 1120, UE 402 may select candidate sidelink resources that are clear or at least satisfy an availability threshold (e.g., minimum SIR) and generate an indication (e.g., report, list, bitmap) of the candidate sidelink resources (e.g., using controller/processor 280 or memory 282). UE 402 may also select one or more preferred sidelink resources for UE 404 and schedule one or more of the preferred sidelink resources for UE 404. UE 402 may mark the scheduled sidelink resources in the indication. UE 402 may select and/or schedule sidelink resources based at least in part on the sensing and/or the indications overheard in broadcast reports by UE 406 and/or UE 414. UE 402 may use and/or report on availability information for a threshold number of recent slots such that overheard availability information is recent. UE 402 may use overheard availability information for initial sidelink resource selections and/or for sidelink resource reselections. By using availability information broadcast by other UEs, UE 402 may help UE 404 to perform as well as when the UE 404 senses the sidelink channel continuously by itself, even under harsher conditions such as with an increased coupling loss (e.g., by 5 dB as observed in simulation results). UE 404 may increase reliability, increase a communication range, improve power consumption, and increase battery life. Battery life may be increased because, with UE 402 developing a better picture of neighboring UE sidelink resource usage, UE 404 may perform little or no sensing of the sidelink channels and may sleep longer.

In some aspects, UE 402 may decide to avoid a sidelink resource indicated as scheduled in one or more overheard reports based at least in part on an RSRP, RSRQ, and/or SIR. The RSRP, RSRQ, and/or SIR may, for example, be based at least in part on recent measurements on a cross-link between UE 402 and, for example, UE 408 an/or an intended link with UE 404.

In some aspects, UE 402 may overhear one or more reports that include one or more candidate sidelink resources and/or one or more scheduled sidelink resources. UE 402, for each overheard report, may ignore the overheard report as a whole and not consider avoiding any of the candidate sidelink resources or scheduled sidelink resources (or any other availability information) indicated in the overheard report. UE 402, for each overheard report, may consider avoiding only the candidate sidelink resources or consider avoiding only the scheduled sidelink resources. UE 402, for each overheard report, may consider avoiding both the candidate sidelink resources and the scheduled sidelink resources.

In some aspects, UE 402 may determine which overheard reports or what information to consider from the overheard reports based at least in part on a rule. For example, UE 402 may rank overheard reports according to RSRP, RSRQ, and/or SIR. A ranking may be in descending order for RSRP and RSRQ measurements and in ascending order for SIR measurements. Then, UE 402 may eliminate any overheard report that has an RSRP or RSRQ lower than a first threshold value or has an SIR higher than a second threshold value. UE 402 may select at most a threshold number of reports (which may be limited according to a threshold number of reports) that are ranked higher than other overheard reports and that have not been eliminated. If the number of overheard reports that are not eliminated is less than the threshold number of reports, UE 402 may use the information in all of the remaining overheard reports.

In some aspects, UE 402 may measure the RSRP and/or RSRQ for a link between UE 402 and another reporting UE, or between UE 402 and another transmitting UE. UE 402 may calculate an SIR by measuring the RSRP and/or RSRQ for links between UE 402 and UE 404 (first measurement) and between UE 402 and another transmitting UE (second measurement), and then subtracting the second measurement from the first measurement on a logarithmic scale.

UE 402 may determine whether to use an overheard report based at least in part on one or more rules. One rule may be that if the RSRP is less than an RSRP threshold, UE 402 may ignore the overheard report. Otherwise, UE 402 may use information from the overheard report. Another rule may be if the RSRQ is less than an RSRQ threshold, UE 402 may ignore the overheard report. Otherwise, UE 402 may use information from the overheard report. Yet another rule may be if the SIR is greater than an SIR threshold, UE 402 may ignore the overheard report. Otherwise, UE 402 may use information from the overheard report. In other words, UE 402 may utilize overheard reports that have a highest potential for interference on a link of UE 402, such as a link from UE 404 to UE 402.

In some aspects, depending on a traffic type, UE 402 may mark a subset of reported resources as scheduled. For example, when traffic is periodic, UE 402 may mark sidelink resources when UE 402 expects UE 404 to use a report during the initial resource selection phase following a new packet arrival. When traffic is aperiodic, UE 402 may mark the sidelink resources when UE 402 receives a report request from UE 404.

In some aspects, for a resource reselection by UE 404, UE 404 may request a new report from UE 402 by using a request mechanism for both periodic and aperiodic traffic. In this scenario, UE 402 may behave as it does for aperiodic report generation and mark a subset of resources as scheduled so that other overhearing UEs are aware of the utilization of these resources.

In some aspects, overhearing UE 402 may avoid only a subset of the scheduled resources in a report since UE 404 may be ending transmissions without consuming all of the scheduled resources (e.g., via HARQ-ACK, UE 402 might acknowledge successful reception of a packet and UE 404 may not proceed with further retransmissions).

If UE 402 overhears multiple reports, such as from both UE 406 and UE 414, UE 402 may combine availability information from each report. For example, UE 402 may perform an AND operation on candidate sidelink resources to determine which candidate sidelink resources to indicate as available and to schedule sidelink resources. In some aspects, UE 402 may give precedence to one or more UEs based at least in part on RSRP levels, RSRQ levels, zone IDs, path loss measurements, and/or estimated distances between UE 402 and other reporting UEs with overheard reports. UE 402 may also give precedence to one or more reporting UEs based at least in part on an expected level of interference that other transmitting UEs (e.g., UE 408, UE 416) may create on an intended link between UE 402 and UE 404.

In some aspects, a number of past slots that are to be overheard and a number of reports to overhear can be indicated to UE 402 dynamically, pre-configured for UE 402, or dynamically selected by UE 402 based at least in part on the history of reception both from UE 404 and other neighboring/interfering UEs (e.g., UE 408, UE 416).

In some aspects, overhearing functionality may be based on a UE capability, may be preconfigured, and/or may be dynamically activated or deactivated based at least in part on a cast type of the communications for which an overhearing UE is reporting, whether periodic transmissions are enabled for a resource pool, a resource pool used for a sidelink communication session, and/or a carrier (in multiple carrier frequency operation) used for cross-link communication. By broadcasting and using sidelink availability information, UE 402 may schedule a sidelink resource for UE 404 with less of a chance of interference from other neighboring UEs.

As shown by reference number 1125, UE 402 may transmit an indication of candidate sidelink resources and scheduled sidelink resources to UE 404 (e.g., using antenna 252, transmit processor 264, TX MIMO processor 266, modulator 254, controller/processor 280, and/or memory 282). UE 402 may transmit the indication in a broadcast to be overheard by other reporting UEs. Therefore, as shown by reference numbers 1130 and 1135, UE 402 may broadcast the indication to other UEs such as UE 406 and UE 414. UE 406 and UE 414 may overhear the broadcast indication from UE 402 and improve their own scheduling of sidelink resources.

As indicated above, FIG. 11 is provided as an example. Other examples may differ from what is described with regard to FIG. 11.

Figure 12:
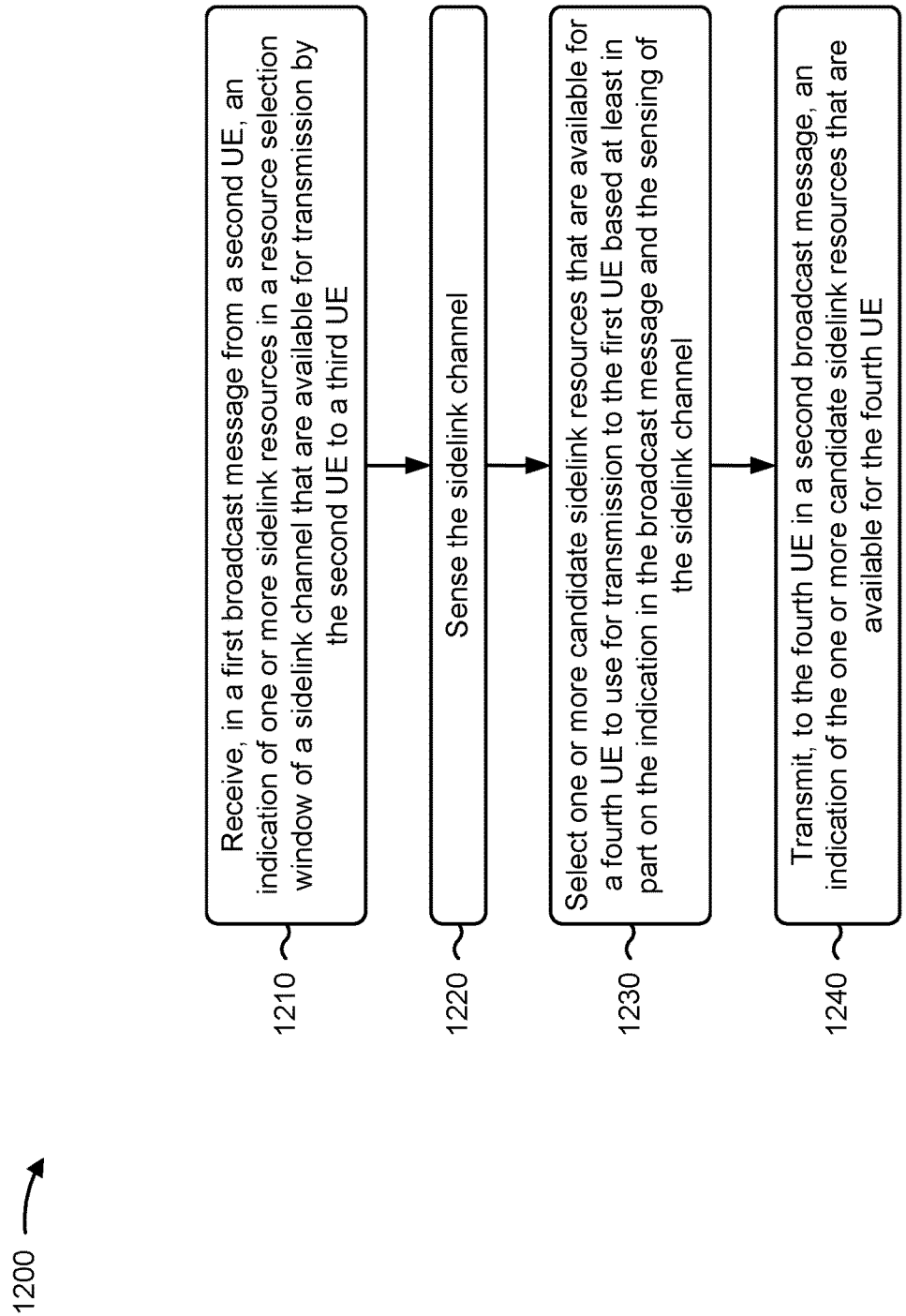
FIG. 12 is a diagram illustrating an example process performed, for example, by a first UE, in accordance with the present disclosure.

FIG. 12 is a diagram illustrating an example process 1200 performed, for example, by a first UE, in accordance with the present disclosure. Example process 1200 is an example where the UE (e.g., UE 120, UE 402) performs operations associated with broadcasting and using indications of sidelink resources.

Figure 13:
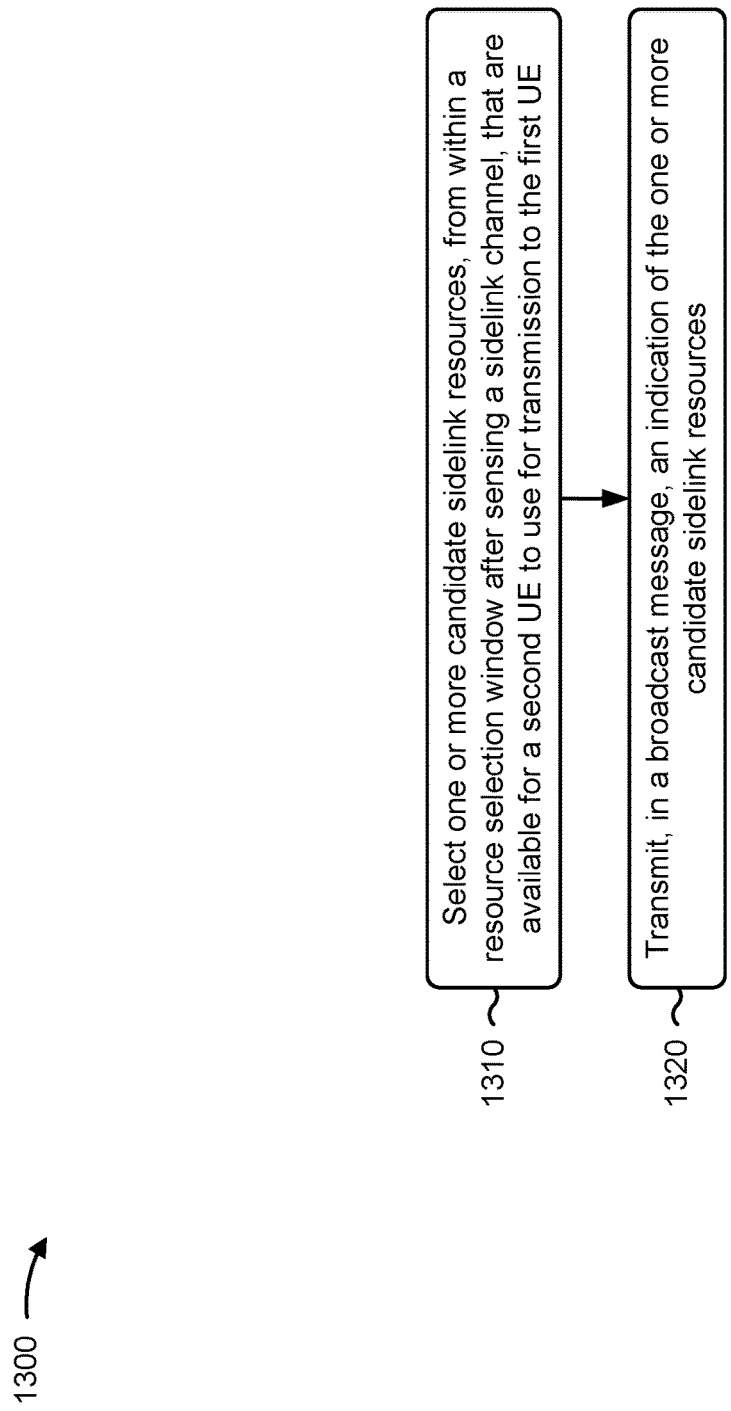
FIG. 13 is a diagram illustrating an example process performed, for example, by a first UE, in accordance with the present disclosure.

In FIG. 12, UE 402 may be referred to as a "first UE" and UE 404 may be referred to as a "second UE" when discussing operations from the viewpoint of UE 402. In FIG. 13, UE 404 may be referred to as the "first UE" and UE 402 may be referred to as the "second UE" when discussing operations from the viewpoint of UE 404, UE 408, or UE 416.

As shown in FIG. 12, in some aspects, process 1200 may include receiving, in a first broadcast message from a second UE, an indication of one or more sidelink resources in a resource selection window of a sidelink channel that are available for transmission by the second UE to a third UE (block 1210). For example, the UE (e.g., using reception component 1402 depicted in FIG. 14) may receive, in a first broadcast message from a second UE, an indication of one or more sidelink resources in a resource selection window of a sidelink channel that are available for transmission by the second UE to a third UE, as described above (e.g., operations 1105 and 1110 depicted in FIG. 11).

As further shown in FIG. 12, in some aspects, process 1200 may include sensing the sidelink channel (block 1220). For example, the UE (e.g., using reception component 1402 depicted in FIG. 14) may sense the sidelink channel, as described above (e.g., operation 1115 depicted in FIG. 11).

As further shown in FIG. 12, in some aspects, process 1200 may include selecting one or more candidate sidelink resources that are available for a fourth UE to use for transmission to the first UE based at least in part on the indication in the broadcast message and the sensing of the sidelink channel (block 1230). For example, the UE (e.g., using selection component 1408 depicted in FIG. 14) may select one or more candidate sidelink resources that are available for a fourth UE to use for transmission to the first UE based at least in part on the indication in the broadcast message and the sensing of the sidelink channel, as described above (e.g., operation 1120 depicted in FIG. 11).

As further shown in FIG. 12, in some aspects, process 1200 may include transmitting, to the fourth UE in a second broadcast message, an indication of the one or more candidate sidelink resources that are available for the fourth UE (block 1240). For example, the UE (e.g., using transmission component 1404 depicted in FIG. 14) may transmit, to the fourth UE in a second broadcast message, an indication of the one or more candidate sidelink resources that are available for the fourth UE, as described above (e.g., operations 1125, 1130, and 1135 depicted in FIG. 11).

Process 1200 may include additional aspects, such as any single aspect or any combination of aspects described below and/or in connection with one or more other processes described elsewhere herein.

In a first aspect, the indication in the first broadcast message also indicates one or more scheduled sidelink resources for the third UE to use for transmission to the second UE, and the selecting of the one or more candidate sidelink resources that are available for the fourth UE is based at least in part on the one or more scheduled sidelink resources indicated for the third UE.

In a second aspect, alone or in combination with the first aspect, process 1200 includes scheduling, from among the one or more candidate sidelink resources that are available for the fourth UE based at least in part on SIRs for the one or more candidate sidelink resources, one or more scheduled sidelink resources that are preferred for transmission to the first UE.

In a third aspect, alone or in combination with one or more of the first and second aspects, the indication in the first broadcast message also indicates one or more scheduled sidelink resources for the third UE to use for transmission to the second UE, and the selecting of the one or more scheduled sidelink resources for the fourth UE is based at least in part on the one or more scheduled sidelink resources indicated for the third UE.

In a fourth aspect, alone or in combination with one or more of the first through third aspects, the selecting of the one or more scheduled sidelink resources for the fourth UE is based at least in part on one or more of SIR, RSRP measurements, or RSRQ measurements for the one or more sidelink resources indicated for the third UE.

In a fifth aspect, alone or in combination with one or more of the first through fourth aspects, the indication in the first broadcast message also indicates one or more scheduled sidelink resources for the third UE to use for transmission to the second UE, and the selecting of the one or more candidate sidelink resources that are available for the fourth UE is based at least in part on expected interference by the one or more scheduled sidelink resources indicated for the third UE.

In a sixth aspect, alone or in combination with one or more of the first through fifth aspects, process 1200 includes receiving a third broadcast message from a fifth UE that includes an indication of one or more sidelink resources for a sixth UE to use for transmission to the fifth UE, and the selecting of the one or more candidate sidelink resources that are available for the fourth UE is further based at least in part on the one or more sidelink resources indicated for the sixth UE.

In a seventh aspect, alone or in combination with one or more of the first through sixth aspects, the selecting of the one or more candidate sidelink resources that are available for the fourth UE is further based at least in part on one or more of RSRP measurements for the third UE and the fifth UE, RSRQ measurements for the third UE and the fifth UE, zone IDs of the third UE and the fifth UE, path loss measurements for the third UE and the fifth UE, or distances for the third UE and the fifth UE.

In an eighth aspect, alone or in combination with one or more of the first through seventh aspects, the selecting of the one or more candidate sidelink resources that are available for the fourth UE is based at least in part on information in the first broadcast message for a threshold number of past slots or a threshold number of other UE reports.

In a ninth aspect, alone or in combination with one or more of the first through eighth aspects, the indication in the first broadcast message also indicates one or more scheduled sidelink resources for the third UE to use for transmission to the second UE, and process 1200 includes activating or deactivating the selecting that is based at least in part on the one or more scheduled sidelink resources indicated for the third UE.

In a tenth aspect, alone or in combination with one or more of the first through ninth aspects, the activating or deactivating is based at least in part on one or more of a UE capability of the first UE, whether periodic transmissions are enabled for a resource pool, a resource pool used for a sidelink communication session, or a carrier used for communication.

In an eleventh aspect, alone or in combination with one or more of the first through tenth aspects, process 1200 includes ranking the first broadcast message and the third broadcast message based at least in part on one or more of RSRP measurements, RSRQ measurements, or SIR measurements of the first broadcast message and the third broadcast message, respectively, and eliminating the first broadcast message or the third broadcast message from consideration based at least in part on one or more of whether RSRP measurements of a respective broadcast message satisfy an RSRP threshold, whether RSRQ measurements of a respective broadcast message satisfy an RSRQ threshold, or whether SIR measurements of a respective broadcast message satisfy an SIR threshold.

In a twelfth aspect, alone or in combination with one or more of the first through eleventh aspects, none of the one or more candidate sidelink resources or the one or more scheduled sidelink resources indicated in the first broadcast message are to be avoided.

In a thirteenth aspect, alone or in combination with one or more of the first through twelfth aspects, only the one or more candidate sidelink resources indicated in the first broadcast message are to be avoided.

In a fourteenth aspect, alone or in combination with one or more of the first through thirteenth aspects, only the one or more scheduled sidelink resources indicated in the first broadcast message are to be avoided.

In a fifteenth aspect, alone or in combination with one or more of the first through fourteenth aspects, the one or more candidate sidelink resources and the one or more scheduled sidelink resources indicated in the first broadcast message are to be avoided.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

FIG. 13 is a diagram illustrating an example process 1300 performed, for example, by a first UE, in accordance with the present disclosure. Example process 1300 is an example where the UE (e.g., UE 120, UE 402, UE 406, UE 414) performs operations associated with broadcasting indications of sidelink resources.

As shown in FIG. 13, in some aspects, process 1300 may include selecting one or more candidate sidelink resources, from within a resource selection window after sensing a sidelink channel, that are available for a second UE to use for transmission to the first UE (block 1310). For example, the UE (e.g., using selection component 1508 depicted in FIG. 15) may select one or more candidate sidelink resources, from within a resource selection window after sensing a sidelink channel, that are available for a second UE to use for transmission to the first UE, as described above (e.g., operation 1120 depicted in FIG. 11).

As further shown in FIG. 13, in some aspects, process 1300 may include transmitting, in a broadcast message, an indication of the one or more candidate sidelink resources (block 1320). For example, the UE (e.g., using transmission component 1504 depicted in FIG. 15) may transmit, in a broadcast message, an indication of the one or more candidate sidelink resources, as described above (e.g., operations 1105, 1110, 1125, 1130, and 1135 depicted in FIG. 11).

Process 1300 may include additional aspects, such as any single aspect or any combination of aspects described below and/or in connection with one or more other processes described elsewhere herein.

In a first aspect, process 1300 includes scheduling, from among the one or more candidate sidelink resources that are available for the second UE based at least in part on SIRs for the one or more candidate sidelink resources, one or more scheduled sidelink resources that are preferred for transmission to the first UE, where the indication indicates the one or more scheduled sidelink resources.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
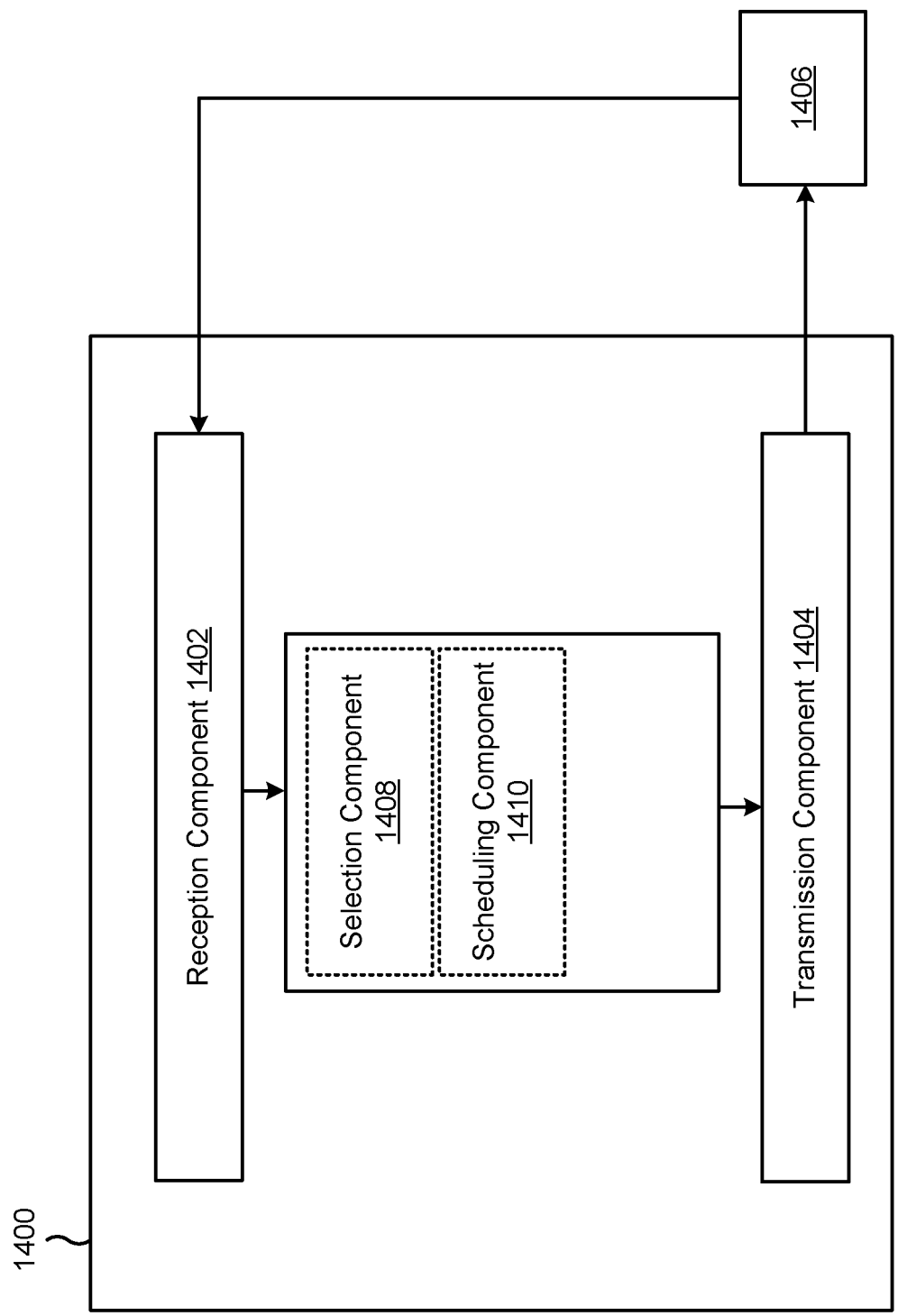
FIGS. 14-15 are block diagrams of example apparatuses for wireless communication, in accordance with the present disclosure.

FIG. 14 is a block diagram of an example apparatus 1400 for wireless communication. The apparatus 1400 may be a first UE, or a first UE may include the apparatus 1400. In some aspects, the apparatus 1400 includes a reception component 1402 and a transmission component 1404, which may be in communication with one another (for example, via one or more buses and/or one or more other components). As shown, the apparatus 1400 may communicate with another apparatus 1406 (such as a UE, a base station, or another wireless communication device) using the reception component 1402 and the transmission component 1404. As further shown, the apparatus 1400 may include one or more of a selection component 1408 and/or a scheduling component 1410, among other examples.

In some aspects, the apparatus 1400 may be configured to perform one or more operations described herein in connection with FIGS. 1-11. Additionally, or alternatively, the apparatus 1400 may be configured to perform one or more processes described herein, such as process 1200 of FIG. 12. In some aspects, the apparatus 1400 and/or one or more components shown in FIG. 14 may include one or more components of the UE described above in connection with FIG. 2. Additionally, or alternatively, one or more components shown in FIG. 14 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1406. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1400. In some aspects, the reception component 1402 may include one or more antennas, a demodulator, a MIMO detector, a receive processor, a controller/processor, a memory, or a combination thereof, of the UE described above in connection with FIG. 2.

The transmission component 1404 may transmit communications, such as reference signals, control information, data communications, or a combination thereof, to the apparatus 1406. In some aspects, one or more other components of the apparatus 1400 may generate communications and may provide the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, a modulator, a transmit MIMO processor, a transmit processor, a controller/processor, a memory, or a combination thereof, of the UE described above in connection with FIG. 2. In some aspects, the transmission component 1404 may be co-located with the reception component 1402 in a transceiver.

The reception component 1402 may receive, in a first broadcast message from a second UE, an indication of one or more sidelink resources in a resource selection window of a sidelink channel that are available for transmission by the second UE to a third UE. The reception component 1402 may sense the sidelink channel. The selection component 1408 may select one or more candidate sidelink resources that are available for a fourth UE to use for transmission to the first UE based at least in part on the indication in the broadcast message and the sensing of the sidelink channel. The transmission component 1404 may transmit, to the fourth UE in a second broadcast message, an indication of the one or more candidate sidelink resources that are available for the fourth UE.

The scheduling component 1410 may schedule, from among the one or more candidate sidelink resources that are available for the fourth UE based at least in part on SIRs for the one or more candidate sidelink resources, one or more scheduled sidelink resources that are preferred for transmission to the first UE.

The reception component 1402 may receive a third broadcast message from a fifth UE that includes an indication of one or more sidelink resources for a sixth UE to use for transmission to the fifth UE, and the selecting of the one or more candidate sidelink resources that are available for the fourth UE is further based at least in part on the one or more sidelink resources indicated for the sixth UE.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally, or alternatively, a set of (one or more) components shown in FIG. 14 may perform one or more functions described as being performed by another set of components shown in FIG. 14.

Figure 15:
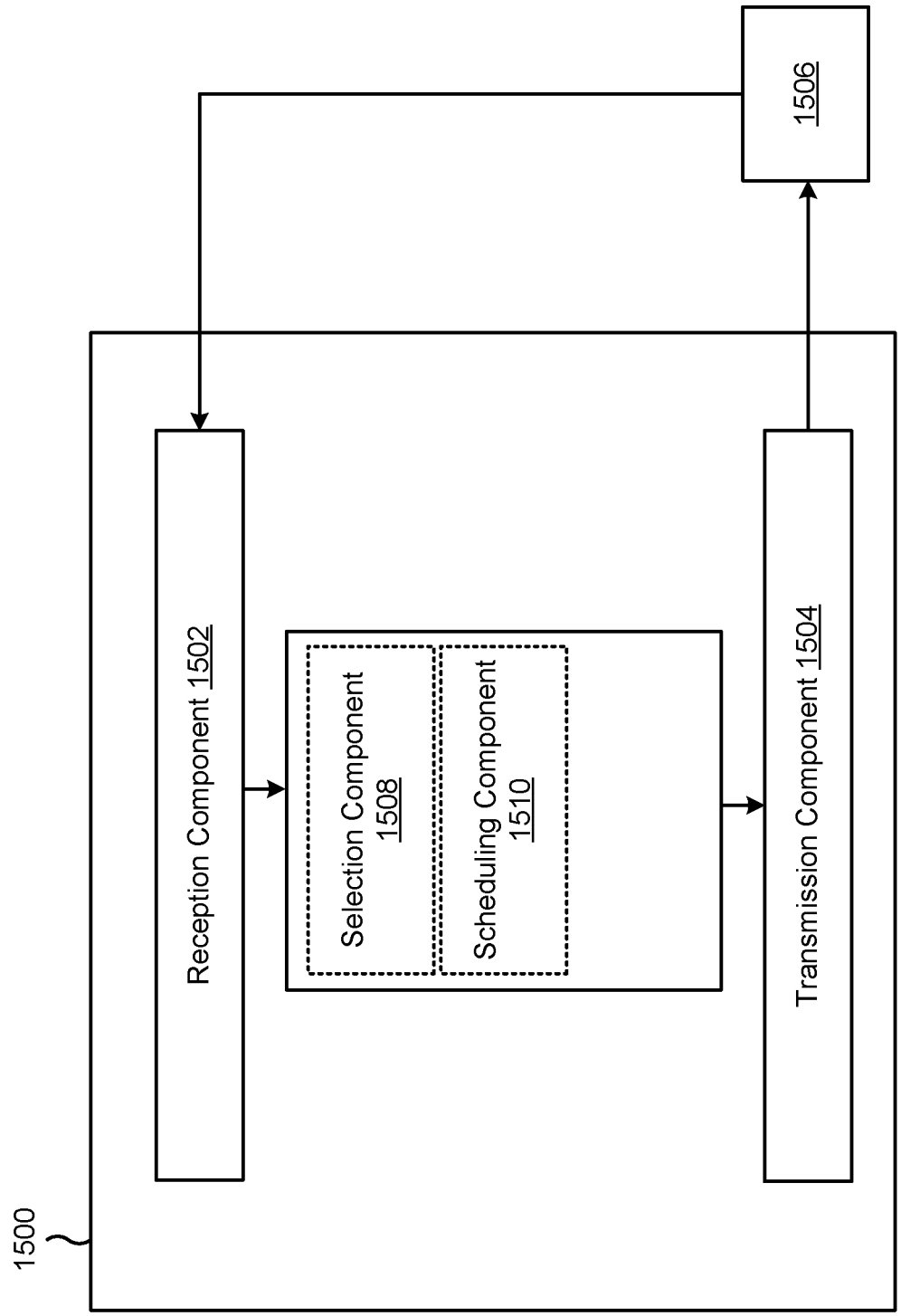

FIG. 15 is a block diagram of an example apparatus 1500 for wireless communication. The apparatus 1500 may be a first UE, or a first UE may include the apparatus 1500. In some aspects, the apparatus 1500 includes a reception component 1502 and a transmission component 1504, which may be in communication with one another (for example, via one or more buses and/or one or more other components). As shown, the apparatus 1500 may communicate with another apparatus 1506 (such as a UE, a base station, or another wireless communication device) using the reception component 1502 and the transmission component 1504. As further shown, the apparatus 1500 may include a selection component 1508 and/or a scheduling component 1510, among other examples.

In some aspects, the apparatus 1500 may be configured to perform one or more operations described herein in connection with FIGS. 1-11. Additionally, or alternatively, the apparatus 1500 may be configured to perform one or more processes described herein, such as process 1300 of FIG. 13. In some aspects, the apparatus 1500 and/or one or more components shown in FIG. 15 may include one or more components of the UE described above in connection with FIG. 2. Additionally, or alternatively, one or more components shown in FIG. 15 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1502 may receive communications, such as reference signals, control information, data communications, or a combination thereof, from the apparatus 1506. The reception component 1502 may provide received communications to one or more other components of the apparatus 1500. In some aspects, the reception component 1502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1500. In some aspects, the reception component 1502 may include one or more antennas, a demodulator, a MIMO detector, a receive processor, a controller/processor, a memory, or a combination thereof, of the UE described above in connection with FIG. 2.

The transmission component 1504 may transmit communications, such as reference signals, control information, data communications, or a combination thereof, to the apparatus 1506. In some aspects, one or more other components of the apparatus 1500 may generate communications and may provide the generated communications to the transmission component 1504 for transmission to the apparatus 1506. In some aspects, the transmission component 1504 may perform signal processing on the generated communications (such as filtering, amplification, modulation, digital-to-analog conversion, multiplexing, interleaving, mapping, or encoding, among other examples), and may transmit the processed signals to the apparatus 1506. In some aspects, the transmission component 1504 may include one or more antennas, a modulator, a transmit MIMO processor, a transmit processor, a controller/processor, a memory, or a combination thereof, of the UE described above in connection with FIG. 2. In some aspects, the transmission component 1504 may be co-located with the reception component 1502 in a transceiver.

The selection component 1508 may select one or more candidate sidelink resources, from within a resource selection window after sensing a sidelink channel, that are available for a second UE to use for transmission to the first UE. The transmission component 1504 may transmit, in a broadcast message, an indication of the one or more candidate sidelink resources.

The scheduling component 1510 may schedule, from among the one or more candidate sidelink resources that are available for the second UE based at least in part on SIRs for the one or more candidate sidelink resources, one or more scheduled sidelink resources that are preferred for transmission to the first UE, wherein the indication indicates the one or more scheduled sidelink resources.

The number and arrangement of components shown in FIG. 15 are provided as an example. In practice, there may be additional components, fewer components, different components, or differently arranged components than those shown in FIG. 15. Furthermore, two or more components shown in FIG. 15 may be implemented within a single component, or a single component shown in FIG. 15 may be implemented as multiple, distributed components. Additionally, or alternatively, a set of (one or more) components shown in FIG. 15 may perform one or more functions described as being performed by another set of components shown in FIG. 15.

The foregoing disclosure provides illustration and description, but is not intended to be exhaustive or to limit the aspects to the precise forms disclosed. Modifications and variations may be made in light of the above disclosure or may be acquired from practice of the aspects.

The following provides an overview of some Aspects of the present disclosure:

Aspect 1: A method of wireless communication performed by a first user equipment (UE), comprising: receiving, in a first broadcast message from a second UE, an indication of one or more sidelink resources in a resource selection window of a sidelink channel that are available for transmission by the second UE to a third UE; sensing the sidelink channel; selecting one or more candidate sidelink resources that are available for a fourth UE to use for transmission to the first UE based at least in part on the indication in the broadcast message and the sensing of the sidelink channel; and transmitting, to the fourth UE in a second broadcast message, an indication of the one or more candidate sidelink resources that are available for the fourth UE.

Aspect 2: The method of Aspect 1, wherein the indication in the first broadcast message also indicates one or more scheduled sidelink resources for the third UE to use for transmission to the second UE, and wherein the selecting of the one or more candidate sidelink resources that are available for the fourth UE is based at least in part on the one or more scheduled sidelink resources indicated for the third UE.

Aspect 3: The method of Aspect 1 or 2, further comprising scheduling, from among the one or more candidate sidelink resources that are available for the fourth UE based at least in part on signal-to-interference ratios for the one or more candidate sidelink resources, one or more scheduled sidelink resources that are preferred for transmission to the first UE.

Aspect 4: The method of Aspect 3, wherein the indication in the first broadcast message also indicates one or more scheduled sidelink resources for the third UE to use for transmission to the second UE, and wherein the selecting of the one or more scheduled sidelink resources for the fourth UE is based at least in part on the one or more scheduled sidelink resources indicated for the third UE.

Aspect 5: The method of Aspect 4, wherein the selecting of the one or more scheduled sidelink resources for the fourth UE is based at least in part on one or more of signal-to-interference ratios, reference signal receive power measurements, or reference signal received quality measurements for the one or more sidelink resources indicated for the third UE.

Aspect 6: The method of any of Aspects 1-5, wherein none of the one or more candidate sidelink resources or the one or more scheduled sidelink resources indicated in the first broadcast message are to be avoided.

Aspect 7: The method of any of Aspects 1-5, wherein only the one or more candidate sidelink resources indicated in the first broadcast message are to be avoided.

Aspect 8: The method of any of Aspects 1-5, wherein only the one or more scheduled sidelink resources indicated in the first broadcast message are to be avoided.

Aspect 9: The method of any of Aspects 1-5, wherein the one or more candidate sidelink resources and the one or more scheduled sidelink resources indicated in the first broadcast message are to be avoided.

Aspect 10: The method of any of Aspects 1-9, wherein the indication in the first broadcast message also indicates one or more scheduled sidelink resources for the third UE to use for transmission to the second UE, and wherein the selecting of the one or more candidate sidelink resources that are available for the fourth UE is based at least in part on expected interference by the one or more scheduled sidelink resources indicated for the third UE.

Aspect 11: The method of any of Aspects 1-10, further comprising receiving a third broadcast message from a fifth UE that includes an indication of one or more sidelink resources for a sixth UE to use for transmission to the fifth UE, and wherein the selecting of the one or more candidate sidelink resources that are available for the fourth UE is further based at least in part on the one or more sidelink resources indicated for the sixth UE.

Aspect 12: The method of Aspect 11, further comprising: ranking the first broadcast message and the third broadcast message based at least in part on one or more of reference signal receive power (RSRP) measurements, reference signal received quality (RSRQ) measurements, or signal-to-noise ratio (SIR) measurements of the first broadcast message and the third broadcast message, respectively; and eliminating the first broadcast message or the third broadcast message from consideration based at least in part on one or more of whether RSRP measurements of a respective broadcast message satisfy an RSRP threshold, whether RSRQ measurements of a respective broadcast message satisfy an RSRQ threshold, or whether SIR measurements of a respective broadcast message satisfy an SIR threshold.

Aspect 13: The method of Aspect 12, wherein the selecting of the one or more candidate sidelink resources that are available for the fourth UE is further based at least in part on one or more of reference signal receive power measurements for the third UE and the fifth UE, reference signal received quality measurements for the third UE and the fifth UE, zone identifiers of the third UE and the fifth UE, path loss measurements for the third UE and the fifth UE, or distances for the third UE and the fifth UE.

Aspect 14: The method of any of Aspects 1-13, wherein the selecting of the one or more candidate sidelink resources that are available for the fourth UE is based at least in part on information in the first broadcast message for a threshold number of past slots or a threshold number of other UE reports.

Aspect 15: The method of any of Aspects 1-14, wherein the indication in the first broadcast message also indicates one or more scheduled sidelink resources for the third UE to use for transmission to the second UE, and wherein the method includes activating or deactivating the selecting that is based at least in part on the one or more scheduled sidelink resources indicated for the third UE.

Aspect 16: The method of Aspect 15, wherein the activating or deactivating is based at least in part on one or more of a UE capability of the first UE, whether periodic transmissions are enabled for a resource pool, a resource pool used for a sidelink communication session, or a carrier used for communication.

Aspect 17: A method of wireless communication performed by a first user equipment (UE), comprising: selecting one or more candidate sidelink resources, from within a resource selection window after sensing a sidelink channel, that are available for a second UE to use for transmission to the first UE; and transmitting, in a broadcast message, an indication of the one or more candidate sidelink resources.

Aspect 18: The method of Aspect 17, further comprising scheduling, from among the one or more candidate sidelink resources that are available for the second UE based at least in part on signal-to-interference ratios for the one or more candidate sidelink resources, one or more scheduled sidelink resources that are preferred for transmission to the first UE, wherein the indication indicates the one or more scheduled sidelink resources.

Aspect 19: An apparatus for wireless communication at a device, comprising a processor; memory coupled with the processor; and instructions stored in the memory and executable by the processor to cause the apparatus to perform the method of one or more of Aspects 1-18.

Aspect 20: A device for wireless communication, comprising a memory and one or more processors coupled to the memory, the one or more processors configured to perform the method of one or more of Aspects 1-18.

Aspect 21: An apparatus for wireless communication, comprising at least one means for performing the method of one or more of Aspects 1-18.

Aspect 22: A non-transitory computer-readable medium storing code for wireless communication, the code comprising instructions executable by a processor to perform the method of one or more of Aspects 1-18.

Aspect 23: A non-transitory computer-readable medium storing a set of instructions for wireless communication, the set of instructions comprising one or more instructions that, when executed by one or more processors of a device, cause the device to perform the method of one or more of Aspects 1-18.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software.

It will be apparent that systems and/or methods described herein may be implemented in different forms of hardware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a first user equipment (UE), comprising:
    receiving, in a first broadcast message from a second UE, an indication of one or more sidelink resources scheduled by a third UE;
    sensing a sidelink channel based at least in part on the one or more sidelink resources;
    selecting one or more candidate sidelink resources that are available for a fourth UE to use for transmission to the first UE based at least in part on the indication in the first broadcast message and the sensing of the sidelink channel; and
    transmitting, to the fourth UE in a second broadcast message, an indication of the one or more candidate sidelink resources that are available for the fourth UE.

2. The method of claim 1, wherein the one or more sidelink resources include a set of sidelink resources scheduled for the third UE to use for transmission to the second UE, and wherein the selecting of the one or more candidate sidelink resources that are available for the fourth UE is based at least in part on the set of sidelink resources.

3. The method of claim 1, further comprising:
    selecting, from among the one or more candidate sidelink resources that are available for the fourth UE based at least in part on signal-to-interference ratios for the one or more candidate sidelink resources, one or more scheduled sidelink resources that are preferred for the fourth UE; and
    scheduling the one or more scheduled sidelink resources for transmission to the first UE.

4. The method of claim 3, wherein the indication in the first broadcast message indicates that the one or more scheduled sidelink resources are for the third UE to use for transmission to the second UE, and
    wherein the selecting of the one or more scheduled sidelink resources is based at least in part on the one or more scheduled sidelink resources for the third UE to use for transmission to the second UE.

5. The method of claim 4, wherein the selecting of the one or more scheduled sidelink resources is based at least in part on one or more of signal-to-interference ratios, reference signal receive power measurements, or reference signal received quality measurements for the one or more scheduled sidelink resources for the third UE to use for transmission to the second UE.

6. The method of claim 5, wherein none of the one or more candidate sidelink resources or the one or more scheduled sidelink resources indicated in the first broadcast message are to be avoided.

7. The method of claim 5, wherein only the one or more candidate sidelink resources indicated in the first broadcast message are to be avoided.

8. The method of claim 5, wherein only the one or more scheduled sidelink resources indicated in the first broadcast message are to be avoided.

9. The method of claim 5, wherein the one or more candidate sidelink resources and the one or more scheduled sidelink resources indicated in the first broadcast message are to be avoided.

10. The method of claim 1, wherein the one or more sidelink resources include a set of sidelink resources scheduled for the third UE to use for transmission to the second UE, and wherein the selecting of the one or more candidate sidelink resources that are available for the fourth UE is based at least in part on expected interference by the set of sidelink resources.

11. The method of claim 1, further comprising receiving a third broadcast message from a fifth UE that includes an indication of one or more sidelink resources for a sixth UE to use for transmission to the fifth UE, and wherein the selecting of the one or more candidate sidelink resources that are available for the fourth UE is further based at least in part on the one or more sidelink resources indicated for the sixth UE.

12. The method of claim 11, further comprising:
ranking the first broadcast message and the third broadcast message based at least in part on one or more of reference signal receive power (RSRP) measurements, reference signal received quality (RSRQ) measurements, or signal-to-noise ratio (SIR) measurements of the first broadcast message and the third broadcast message, respectively; and
eliminating the first broadcast message or the third broadcast message from consideration based at least in part on one or more of whether RSRP measurements of a respective broadcast message satisfy an RSRP threshold, whether RSRQ measurements of a respective broadcast message satisfy an RSRQ threshold, or whether SIR measurements of a respective broadcast message satisfy an SIR threshold.

13. The method of claim 11, wherein the selecting of the one or more candidate sidelink resources that are available for the fourth UE is further based at least in part on one or more of reference signal receive power measurements for the third UE and the fifth UE, reference signal received quality measurements for the third UE and the fifth UE, zone identifiers of the third UE and the fifth UE, path loss measurements for the third UE and the fifth UE, or distances for the third UE and the fifth UE.

14. The method of claim 1, wherein the selecting of the one or more candidate sidelink resources that are available for the fourth UE is based at least in part on information in the first broadcast message for a threshold number of past slots or a threshold number of other UE reports.

15. The method of claim 2, further comprising:
activating or deactivating whether the selecting is based at least in part on the set of sidelink resources.

16. The method of claim 15, wherein the activating or deactivating is based at least in part on one or more of a UE capability of the first UE, whether periodic transmissions are enabled for a resource pool, a resource pool used for a sidelink communication session, or a carrier used for communication.

17. A method of wireless communication performed by a first user equipment (UE), comprising:
receiving, in a first broadcast message from a second UE, an indication of one or more sidelink resources scheduled by a third UE;
selecting one or more candidate sidelink resources, from within a resource selection window after sensing a sidelink channel, that are available for a second UE to use for transmission to the first UE, wherein the sensing of the sidelink channel is based at least in part on the one or more sidelink resources; and
transmitting, in a second broadcast message, an indication of the one or more candidate sidelink resources.

18. The method of claim 17, further comprising scheduling, from among the one or more candidate sidelink resources that are available for the second UE based at least in part on signal-to-interference ratios for the one or more candidate sidelink resources, one or more scheduled sidelink resources that are preferred for transmission to the first UE, wherein the indication in the first broadcast message indicates that the one or more scheduled sidelink resources are for the third UE to use for transmission to the second UE.

19. A first user equipment (UE) for wireless communication, comprising:
one or more memories; and
one or more processors, coupled to the one or more memories, configured to:
receive, in a first broadcast message from a second UE, an indication of one or more sidelink resources scheduled by a third UE;
sense a sidelink channel based at least in part on the one or more sidelink resources;
select one or more candidate sidelink resources that are available for a fourth UE to use for transmission to the first UE based at least in part on the indication in the first broadcast message and the sensing of the sidelink channel; and
transmit, to the fourth UE in a second broadcast message, an indication of the one or more candidate sidelink resources that are available for the fourth UE.

20. The first UE of claim 19, wherein the one or more sidelink resources include a set of sidelink resources scheduled for the third UE to use for transmission to the second UE, and wherein the one or more processors are configured to select the one or more candidate sidelink resources that are available for the fourth UE based at least in part on the set of sidelink resources.

21. The first UE of claim 19, wherein the one or more processors are configured to:
select, from among the one or more candidate sidelink resources that are available for the fourth UE based at least in part on signal-to-interference ratios for the one or more candidate sidelink resources, one or more scheduled sidelink resources that are preferred for the fourth UE; and
schedule the one or more scheduled sidelink resources for transmission to the first UE.

22. The first UE of claim 21, wherein the indication in the first broadcast message indicates that the one or more scheduled sidelink resources are for the third UE to use for transmission to the second UE, and
wherein the one or more processors are configured to select the one or more scheduled sidelink resources based at least in part on the one or more scheduled sidelink resources for the third UE to use for transmission to the second UE.

23. The first UE of claim 22, wherein the one or more processors are configured to select the one or more scheduled sidelink resources based at least in part on one or more of signal-to-interference ratios, reference signal receive power measurements, or reference signal received quality measurements for the one or more scheduled sidelink resources for the third UE to use for transmission to the second UE.

24. The first UE of claim 23, wherein none of the one or more candidate sidelink resources or the one or more scheduled sidelink resources indicated in the first broadcast message are to be avoided.

25. The first UE of claim 23, wherein only the one or more candidate sidelink resources indicated in the first broadcast message are to be avoided.

26. The first UE of claim 23, wherein only the one or more scheduled sidelink resources indicated in the first broadcast message are to be avoided.

27. The first UE of claim 23, wherein the one or more candidate sidelink resources and the one or more scheduled sidelink resources indicated in the first broadcast message are to be avoided.

28. The first UE of claim 19, wherein the one or more sidelink resources include a set of sidelink resources scheduled for the third UE to use for transmission to the second UE, and wherein the one or more processors are configured to select the one or more candidate sidelink resources that are available for the fourth UE based at least in part on expected interference by the set of sidelink resources.

29. A first user equipment (UE) for wireless communication, comprising:
one or more memories; and
one or more processors, coupled to the one or more memories, configured to:
receive, in a first broadcast message from a second UE, an indication of one or more sidelink resources scheduled by a third UE;
select one or more candidate sidelink resources, from within a resource selection window after sensing a sidelink channel, that are available for a second UE to use for transmission to the first UE, wherein the sensing of the sidelink channel is based at least in part on the one or more sidelink resources; and
transmit, in a second broadcast message, an indication of the one or more candidate sidelink resources.

30. The first UE of claim 29, wherein the one or more processors are configured to schedule, from among the one or more candidate sidelink resources that are available for the second UE based at least in part on signal-to-interference ratios for the one or more candidate sidelink resources, one or more scheduled sidelink resources that are preferred for transmission to the first UE, and wherein the indication in the first broadcast message indicates that the one or more scheduled sidelink resources are for the third UE to use for transmission to the second UE.

* * * * *